US011693707B2

(12) United States Patent
Yu et al.

(10) Patent No.: US 11,693,707 B2
(45) Date of Patent: Jul. 4, 2023

(54) ELECTRONIC DEVICE FOR EXECUTING MULTIPLE OPERATING SYSTEMS AND METHOD OF CONTROLLING SAME

(71) Applicant: Samsung Electronics Co., Ltd., Suwon-si (KR)

(72) Inventors: Hyungseok Yu, Suwon-si (KR); Donguk Seo, Suwon-si (KR); Kyungjoong Shin, Suwon-si (KR); Junyong Choi, Suwon-si (KR); Eungchan Kim, Suwon-si (KR); Kyongha Park, Suwon-si (KR); Yong Shin, Suwon-si (KR); Changsoo Shin, Suwon-si (KR); Kyungsik Yoon, Suwon-si (KR); Kyungsun Lee, Suwon-si (KR); Shinjae Lee, Suwon-si (KR); Hyungil Lee, Suwon-si (KR); Myungsu Cha, Suwon-si (KR); Kwangsik Choi, Suwon-si (KR); Seyoung Choi, Suwon-si (KR); Yurak Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/734,720

(22) Filed: May 2, 2022

(65) Prior Publication Data
US 2022/0261291 A1  Aug. 18, 2022

Related U.S. Application Data

(63) Continuation of application No. 16/596,162, filed on Oct. 8, 2019, now Pat. No. 11,327,803.

(30) Foreign Application Priority Data

Oct. 16, 2018 (KR) .......................... 10-2018-0123397

(51) Int. Cl.
*G06F 9/46* (2006.01)
*G06F 9/50* (2006.01)

(52) U.S. Cl.
CPC ................................. *G06F 9/5044* (2013.01)

(58) Field of Classification Search
CPC ..................................................... G06F 9/5044
See application file for complete search history.

(56) References Cited

U.S. PATENT DOCUMENTS

| 2011/0016299 A1 | 1/2011 | Galicia et al. |
| 2011/0016301 A1 | 1/2011 | Galicia et al. |

(Continued)

FOREIGN PATENT DOCUMENTS

KR  10-2013-0013371 A  2/2013

OTHER PUBLICATIONS

Korean Office Action with English translation dated Apr. 29, 2023; Korean Appln. No. 10-2018-0123397.

*Primary Examiner* — Gregory A Kessler
(74) *Attorney, Agent, or Firm* — Jefferson IP Law, LLP

(57) ABSTRACT

An electronic device for executing various operating systems is provided. The electronic device includes first and second hardware devices, a first operating system (OS), a second OS different from the first OS, and a processor configured to control the first hardware device to process first data from a first program executed on the first OS, obtain a command for executing the second OS, generate a container for executing the second OS based on a kernel of the first OS in response to the command for executing the second OS, execute the second OS on the generated container, execute a second program on the second OS, obtain second data regarding the second program from the second OS via socket communication by a control application installed on the first OS, and control the second hardware (Continued)

device to process the second data regarding the second program based on the first OS using the installed control application.

17 Claims, 23 Drawing Sheets

(56) References Cited

U.S. PATENT DOCUMENTS

| | | |
|---|---|---|
| 2011/0126216 A1 | 5/2011 | Galicia et al. |
| 2012/0278747 A1 | 11/2012 | Abraham et al. |
| 2013/0027364 A1 | 1/2013 | Kim et al. |
| 2016/0062807 A1 | 3/2016 | Reeves et al. |
| 2016/0283261 A1 | 9/2016 | Nakatsu |
| 2016/0381058 A1 | 12/2016 | Antony |
| 2017/0249469 A1 | 8/2017 | Goyal et al. |
| 2017/0269978 A1 | 9/2017 | Engel et al. |
| 2018/0246715 A1 | 8/2018 | Regmi et al. |

ELECTRONIC DEVICE FOR EXECUTING MULTIPLE OPERATING SYSTEMS AND METHOD OF CONTROLLING SAME

CROSS-REFERENCE TO RELATED APPLICATION(S)

This application is a continuation application of prior application Ser. No. 16/596,162, filed on Oct. 8, 2019, which is based on and claims priority under 35 U.S.C. § 119 of a Korean patent application number 10-2018-0123397, filed on Oct. 16, 2018, in the Korean Intellectual Property Office, the disclosure of which is incorporated by reference herein in its entirety.

BACKGROUND

1. Field

The disclosure relates to electronic devices for executing a plurality of operating systems and methods of controlling the same.

2. Description of Related Art

Portable digital communication devices have become must-have items for modern people. Customers desire to receive various high-quality services anytime, anywhere. As the hardware resources of electronic devices routinely used (e.g., various sensors, home appliances, or communication devices) are controlled by programs running on the electronic devices, a diversity of high-quality services may be provided.

The hardware resources included in electronic devices are controlled by the operating systems executed on the electronic devices. Stable distribution of hardware resources requires that there be no conflicts between the hardware resources as the operating systems (OS) runs. Electronic devices need to build up an environment where the OS may run in a stable manner.

In conventional electronic devices, one operating system (OS) (e.g., a host OS) running on an electronic device allots the hardware resources (e.g., central processing unit (CPU), memory, or display) of the electronic device to a program running on the OS and, thus, a service related to the running program may be provided to the user. However, if a different OS (e.g., a guest OS) is executed on the electronic device, a service related to the program running on the different OS may not be provided to the user because there is no function of allocating the hardware resources of the electronic device to programs running on the different OS.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method of operating the same that may form an environment (e.g., generate a container or allocate a namespace) in which a plurality of OSs are executable so that the plurality of OSs may be executed on the electronic device and may dynamically allocate the hardware resources of the electronic device to a program executed on each of the plurality of OSs using a control application running on one OS.

Another aspect of the disclosure is to provide an electronic device where a plurality of different OSs may be executed without any conflict therebetween and a method of controlling the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes at least one first hardware device, at least one second hardware device, a first operating system (OS), a second OS different from the first OS, and at least one processor configured to control the at least one first hardware device to process first data from a first program executed on the first OS, obtain a command for executing the second OS, generate a container for executing the second OS based on a kernel of the first OS in response to the command for executing the second OS, execute the second OS on the generated container, execute a second program on the second OS, obtain second data regarding the second program from the second OS via socket communication by a control application installed on the first OS, and control the at least one second hardware device to process the second data regarding the second program based on the first OS using the installed control application.

In accordance with another aspect of the disclosure, a method for controlling an electronic device is provided. The method includes controlling at least one first hardware device included in the electronic device to process first data from a first program executed on a first OS, obtaining a command for executing a second OS different from the first OS, generating a container for executing the second OS based on a kernel of the first OS in response to the command for executing the second OS, executing the second OS on the generated container, executing a second program on the second OS, obtaining second data regarding the second program from the second OS via socket communication by a control application installed on the first OS, and controlling at least one second hardware device included in the electronic device to process the second data regarding the second program based on the first OS using the installed control application.

In accordance with another aspect of the disclosure, an electronic device is provided. The electronic device includes a display, at least one processor operatively connected with the display, and a memory operatively connected to the at least one processor, wherein the memory stores instructions executed to enable the at least one processor to display at least one first icon for executing each of at least one first application associated with a first OS and a second icon for executing a second OS different from the first OS on the display, receive a first input for the second icon, display at least one third icon for executing each of at least one second application associated with the second OS on at least part of the display based on the first input, receive a second input for one of the at least one third icon, and display an execution screen of an application corresponding to an icon designated by the second input on the at least part of the display based on the second input.

Embodiments of the disclosure are not limited to the foregoing objectives, and other objectives would readily be appreciated by a skilled artisan from the following detailed description taken in conjunction with the accompanying drawings.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
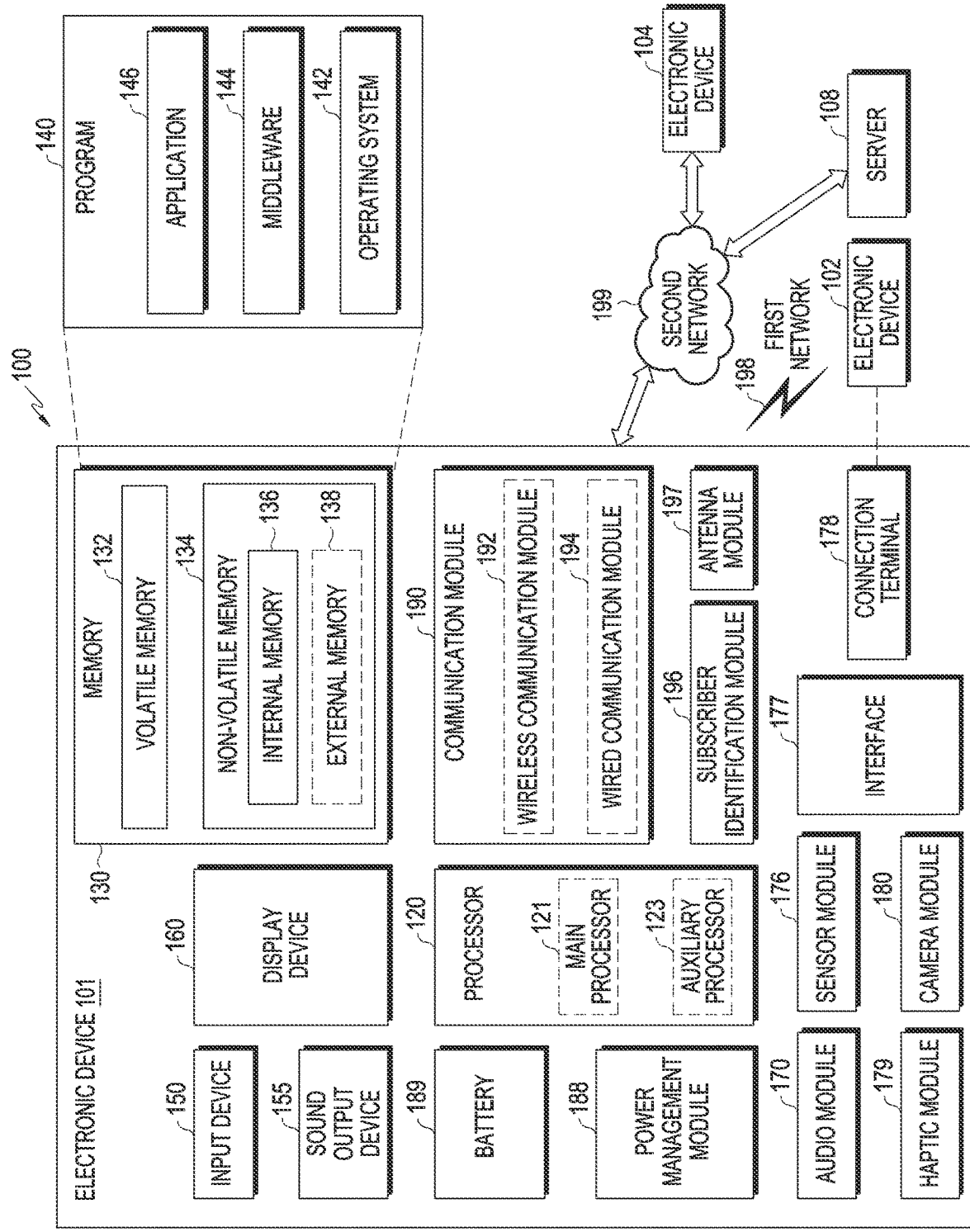
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of the disclosure are described with reference to the accompanying drawings. However, it should be appreciated that the disclosure is not limited to the embodiments and the terminology used herein, and all changes and/or equivalents or replacements thereto also belong to the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device or external electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the electronic device or external electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

According to an embodiment of the disclosure, the electronic device or external electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device or external electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the electronic device or at least one or more external electronic devices may be flexible or may be a combination of the above-enumerated electronic devices. According to an embodiment of the disclosure, the electronic device or at least one or more external electronic devices are not limited to the above-listed embodiments. As used herein, the term "user" may denote a human or another device using the electronic device or at least one or more external electronic devices (e.g., an artificial intelligent electronic device).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performance to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
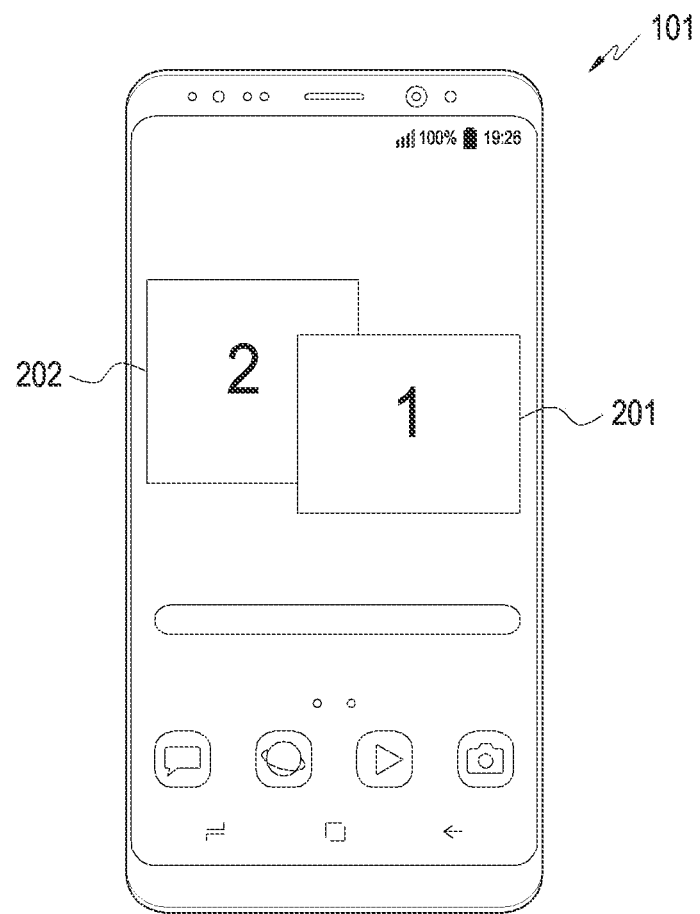
FIG. 2A is a view illustrating a method of controlling an electronic device executing a first OS and a second OS of the electronic device according to an embodiment of the disclosure.

FIG. 2A is a view illustrating a method of controlling an electronic device 101 executing a first OS and a second OS of the electronic device 101 according to an embodiment of the disclosure.

Figure 2B:
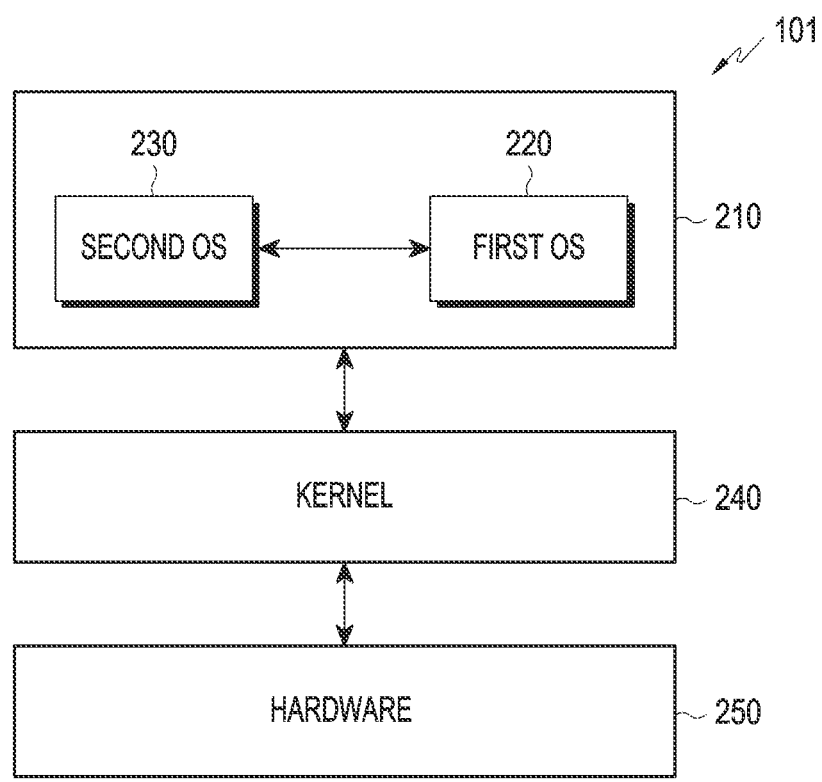
FIG. 2B is a view illustrating an example system structure of an electronic device according to an embodiment of the disclosure.

FIG. 2B is a view illustrating an example system structure of an electronic device 101 according to an embodiment of the disclosure.

A method of controlling the electronic device 101 to execute a first OS 220 and a second OS 230 is described below with reference to FIGS. 2A and 2B.

Referring to FIG. 2A, the electronic device 101 (e.g., at least one processor 120) may control at least one hardware device (e.g., a display or audio device) included in the electronic device 101 according to a first program 201 executed on the first OS and a second program 202 executed on the second OS. In other words, the electronic device 101 may allocate at least one hardware resource to the first program 201 executed on the first operation and the second program 202 executed on the second OS. For example, the electronic device 101 may display an execution screen of the first program 201 executed on the first operation on at least a first portion of the display included in the electronic device 101 and an execution screen of the second program 202 executed on the second OS on at least a second portion of the display as shown in FIG. 2A. The execution screen of the first program 201 and the execution screen of the second program 202 may be displayed so that any one of the execution screens of the first program 201 and the execution screen of the second program 202 hides at least a portion of the other. Without limitations to what has been set forth herein, the electronic device 101 may control an external electronic device (e.g., an external display or external audio device) connected to the electronic device 101. For example, the electronic device 101 may transfer data via a hub device to an external display to display an execution screen of the first program 201 executed on the first operation on at least a first portion of the external display and an execution screen of the second program 202 executed on the second OS on at least a second portion of the external display.

Referring to FIG. 2B, the electronic device (e.g., the electronic device 101 of FIG. 1) may include operating systems (OSs) 210 and simultaneously execute a plurality of OSs. The OSs 210 may include a first OS 220 and a second OS 230. For example, the first OS 220 may be an Android OS in an embedded environment intended for use in the electronic device, and the second OS 230 may be a Linux OS. The second OS 230 may include Ubuntu® for a Linux-based OS. The first OS 220 may be referred to as a host OS, and the second OS 230 may be referred to as a guest OS. The electronic device 101 may execute the guest OS (second OS 230) based on the host OS (first OS 220).

The first OS 220 and the second OS 230 may operate independently from each other and co-exist and, when operated based on Linux, they may be dependent upon each other. In other words, the first OS and the second OS may be both OSs based on the Linux kernel. The first OS 220 and second OS 230 of the OSs 210 may communicate with the kernel 240 and may communicate with each other as indicated with the arrow. According to an embodiment, although Android and Linux are taken as examples of OSs which may belong to the OSs 210, other various types of OSs than Android and Linux may be added or used instead. Thus, the OSs 210 may include two or more, various types of OSs, and the plurality of OSs may exist independently on the same kernel 240 (or different cores/kernels). In other words, two or more various types of OSs may be stored in a memory in the form of, e.g., codes, programs, or instructions to execute the OSs, which may be interpreted as the two or more various OSs are included in the electronic device 101.

The kernel 240 may allocate each resource of the electronic device by connecting and managing interactions between individual middleware units of the first OS 220 and the second OS 230 of the OSs 210 and the physical components of a plurality of hardware units 250. For example, the kernel 240 may be a Linux kernel.

The plurality of hardware units 250 may include various types of hardware units. The plurality of hardware units 250 may be devices coupled with a processor (e.g., the processor 120 of FIG. 1) configured to perform various functions and computational operations. For example, the plurality of hardware unit 250 may include a memory coupled with the processor (e.g., the processor 120 of FIG. 1). The memory (e.g., the memory 130 of FIG. 1) may store instructions computer-executable to perform various functions and operations to control execution of heterogeneous OSs.

According to an embodiment, the electronic device 101 (e.g., at least one processor 120) may form an environment where the first OS and the second OS may simultaneously run on the electronic device 101. For example, the electronic device 101 may perform control so that resources allocated to the first OS do not conflict with resources allocated to the second OS.

Without limitations to what has been set forth herein, the electronic device 101 may run other additional OSs than the second OS based on various embodiments of methods of controlling the electronic device 101 running the second OS described below.

Various embodiments of methods of controlling the electronic device 101 running the first OS and the second OS are described below.

Figure 3:
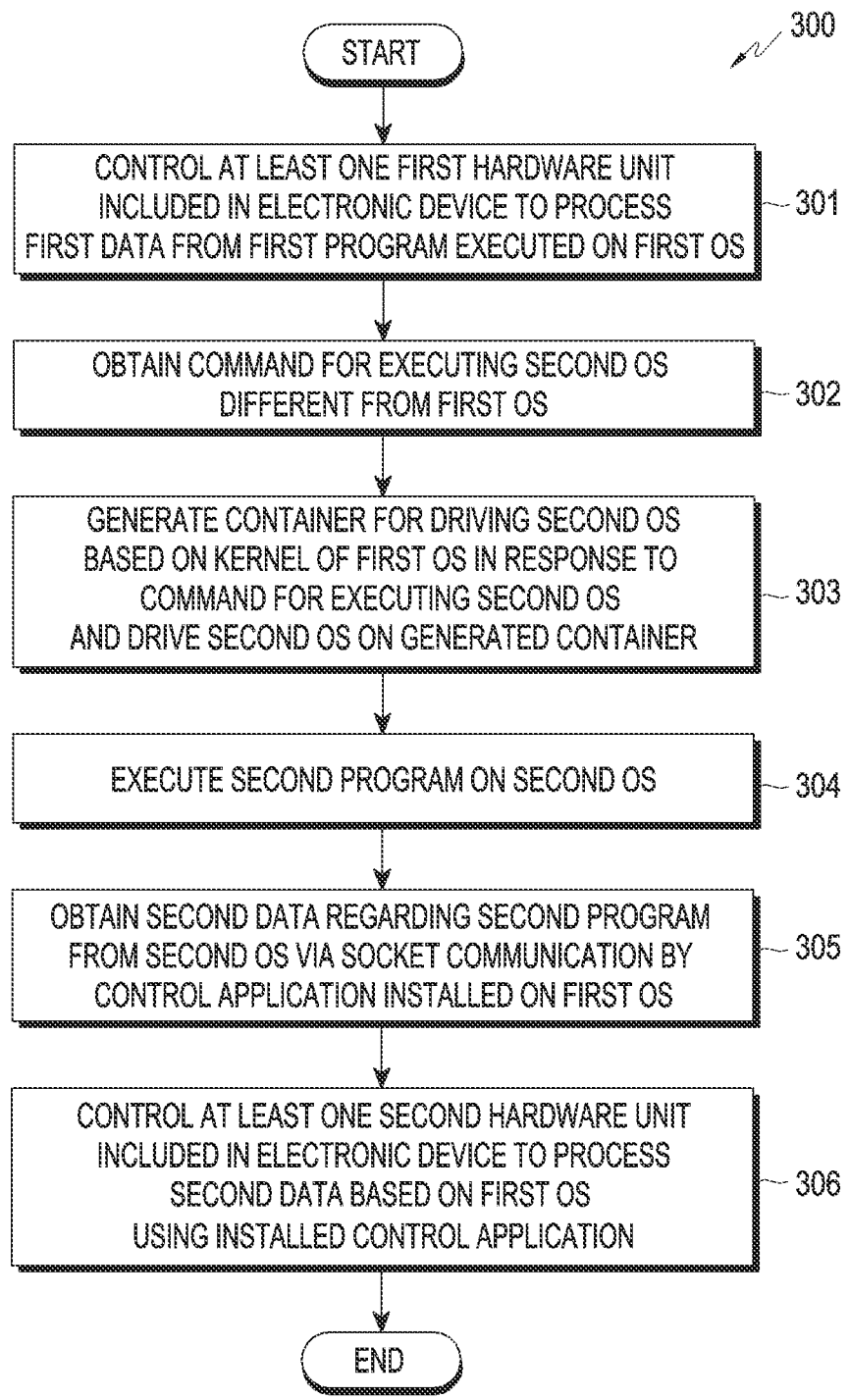
FIG. 3 is a flowchart illustrating an example control method of executing a first OS and a second OS of an electronic device according to an embodiment of the disclosure.

FIG. 3 is a flowchart 300 illustrating an example control method of executing a first OS and a second OS of an electronic device 101 according to an embodiment of the disclosure.

Referring to FIG. 3, operations of the electronic device 101 are not limited to the operations of the electronic device 101 shown in FIG. 3 and may be performed in a different order than that shown or some operations may simultaneously be performed. According to an embodiment, other additional operations than the operations of the electronic device 101 shown in FIG. 3 may be performed or some of the operations of the electronic device 101 shown in FIG. 3 may be omitted.

According to an embodiment, the electronic device 101 (e.g., at least one processor 120) may execute the second program 202 on the second OS 230 while executing the first program 201 on the first OS 220 based on a control application installed on the electronic device 101.

According to an embodiment, the electronic device 101 (e.g., at least one processor 120) may control at least one first hardware unit included in the electronic device 101 to process first data from the first program 201 running on the first OS 220 in operation 301.

According to an embodiment, the electronic device 101 (e.g., at least one processor 120) may obtain a command to execute the second OS 230 different from the first OS 220 in operation 302. For example, the electronic device 101 may obtain a command to execute the control application to execute the second OS 230. As an example, the electronic device 101 may obtain the execution command of the control application by receiving an input to execute the control application from the user. As another example, as a designated condition is met, the electronic device 101 may obtain the execution command of the control application. For example, upon receiving a command to execute a designated application among a plurality of applications installed on the first OS 220, the electronic device 101 may execute the control application in response to the reception of the command to execute the designated application. Upon receiving an execution command to execute the designated application on the first OS 220, the electronic device 101 may execute the designated application on the first OS 220 and may provide the user with the second OS 230 which is executed as the control application is executed in response to the execution of the designated application, thereby providing the user with more comfortable use of the first OS 220 and the second OS 230. Upon receiving an execution command to execute the designated application on the first OS 220, the electronic device 101 may allow data related to the display assembly to be processed using the executed control application, thereby enabling the display assembly to be executed on the second OS 230.

According to an embodiment, in operation 303, the electronic device 101 (e.g., at least one processor 120) may generate a container to execute the second OS 230 based on the kernel 240 of the first OS 220 in response to the command to execute the second OS 230 and execute the second OS 230 on the generated container.

According to an embodiment, the electronic device 101 (e.g., at least one processor 120) may execute the second OS 230 on a pre-generated container. According to an embodiment, at least one container sharing the kernel 240 may previously be generated and, in this state, the electronic device 101 may allocate a designated one of the at least one container as a container for executing the second OS 230. The operation of allocating the designated container may control the processor (e.g., the processor 120 of FIG. 1) of the electronic device to allow the first OS 220 to allocate the designated container or control the allocation via the control application. As described above, when a particular container for executing the second OS 230 is allocated, data related to the second OS 230 may be isolated and operated using the particular container. According to an embodiment, the pre-generated containers may be generated using the kernel 240 while the electronic device 101 simultaneously boots up. After the container is generated, when the above-described designated condition is met (e.g., an execution command for executing the control application or boot-up of the electronic device 101), the electronic device 101 may execute the second OS 230 on one selected from among at least one pre-generated container.

According to an embodiment, the electronic device 101 (e.g., at least one processor 120) may execute the second program 202 on the second OS 230 in operation 304.

According to an embodiment, the electronic device 101 (e.g., at least one processor 120) may obtain second data regarding the second program 202 from the second OS 230 via socket communication by the control application installed on the first OS 220 in operation 305. The second data regarding the second program 202 may be defined as data generated as the second program 202 is executed or data which should be processed by at least one hardware unit (e.g., the second hardware unit) among the plurality of hardware units 250 included in the electronic device 101 as the second program 202 is executed. The second data regarding the second program 202 may include at least one or more types of data. For example, the second data regarding the second program 202 may include data regarding the graphic information about the second program 202 and data regarding audio information about the second program 202. In other words, the second data regarding the second program 202 may include data which should be processed by each of different hardware units (e.g., a display or audio device) included in the electronic device 101 (e.g., data supposed to be processed by the display or data supposed to be processed by the audio device). The second data is not limited thereto but may rather include other various types of data than the data regarding graphic information or the data regarding audio information.

According to an embodiment, in operation 306, the electronic device 101 (e.g., at least one processor 120) may control at least one second hardware unit included in the electronic device 101 to process the second data obtained based on the first OS 220 using the installed control application. In other words, the electronic device 101 (e.g., at least one processor 120) may allocate at least one resource (e.g., a hardware resource) to process the second data based on the first OS 220. For example, the electronic device 101 may control the display included in the electronic device 101 to process data related to graphic information among the obtained pieces of second data (e.g., display the execution screen of the second program 202) and control the audio device of the electronic device 101 to process data related to audio information among the obtained pieces of second data (e.g., output an audio related to execution of the second program 202) based on the first OS 220 using the control application.

Operations 301 to 306 of the electronic devices are described below in greater detail.

Operation 301 of the electronic device 101 is described with reference to FIGS. 4, 5A and 5B.

Figure 4:
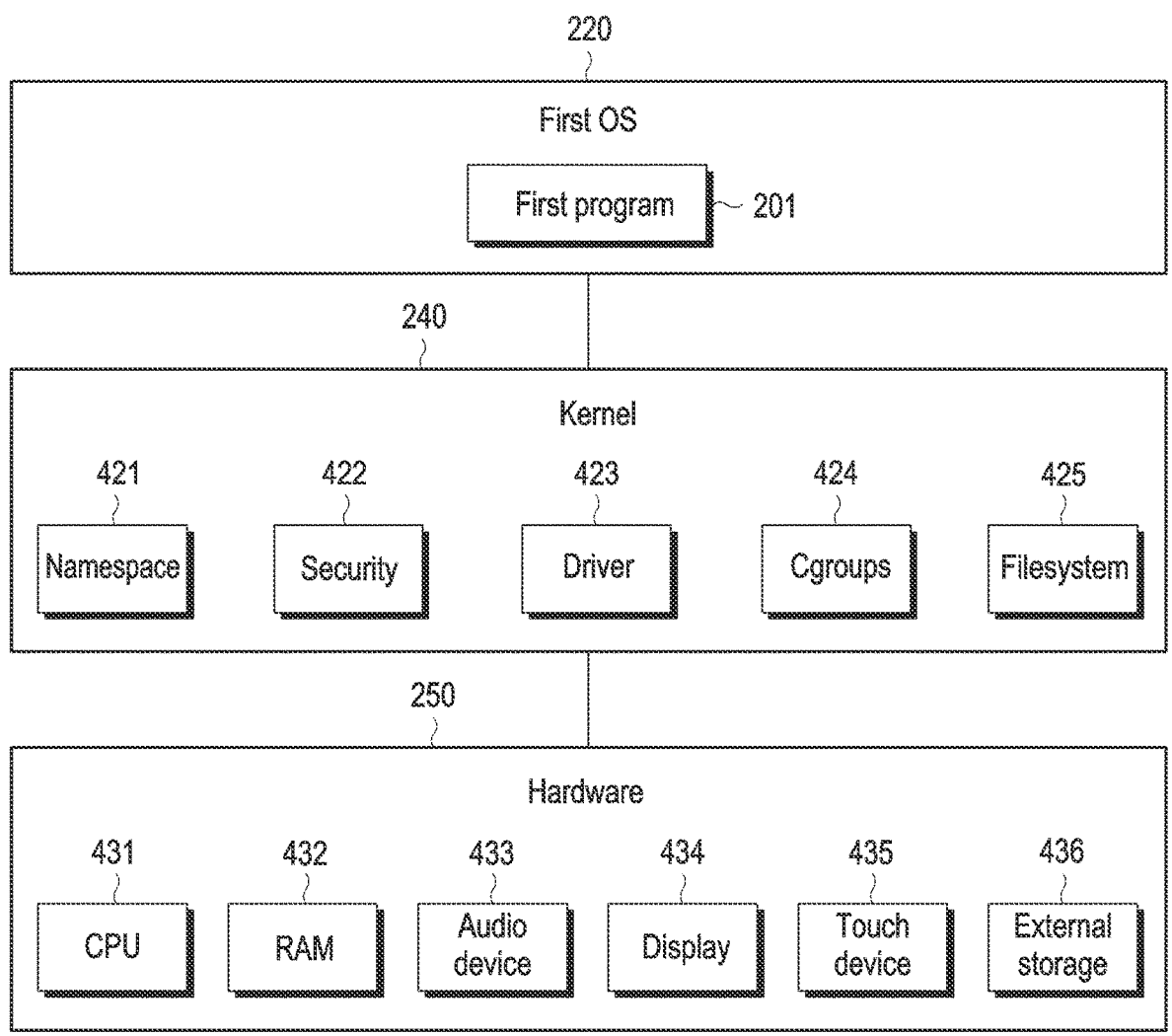
FIG. 4 is a view illustrating an example system structure of an electronic device according to an embodiment of the disclosure.

FIG. 4 is a view illustrating an example system structure of an electronic device 101 according to an embodiment of the disclosure. The components (e.g., 421 to 425) of the kernel 240 shown in FIG. 4 mean functions available via the kernel 240. The kernel 240 is not limited to the functions shown in FIG. 4 but may rather perform more functions.

Referring to FIG. 4, the electronic device 101 may include a first OS 220, the kernel 240, and a plurality of hardware units 250.

According to an embodiment, the first OS 220 may include a first program 201. The first program 201 may be various programs executable based on the first OS 220. For example, when the first OS 220 is an Android OS, the first program 201 may be, e.g., a program to display an Android home screen or various applications (e.g., a gallery program) based on the Android OS.

According to an embodiment, the kernel 240 (e.g., a Linux kernel) of the first OS 220 may be a program to provide various functions for executing the OS. For example, the kernel 240 may include at least one of a namespace function 421 to allocate at least one process (e.g., a process to execute the second OS 230) related to the first OS 220 to at least one namespace to isolate from the first OS 220, a security function 422, a driver function 423 to access the hardware resource of the electronic device 101, a control groups (Cgroups) function 424 to allocate at least one system resource to at least one process related to the first OS 220, or a file system function 425 to identify a file or program stored in the electronic device 101.

According to an embodiment, the electronic device 101 may include at least one hardware resource 250. The at least one hardware resource may include at least one system hardware resource including a CPU 431 or a memory 432 (e.g., random-access memory (RAM) and an input/output hardware unit, e.g., an audio device 433, a display 434, a touchscreen 435, or an external storage device 436.

According to an embodiment, the electronic device 101 (e.g., at least one processor 120) may control at least one first hardware unit included in the electronic device 101 to process first data from the first program 201 running on the first OS 220 using the kernel 240 of the first OS 220 as, at least, part of operation 301. For example, when a program to execute the home screen on the first OS 220 is executed, the electronic device 101 may process data from the program related to the home screen based on the driver of the kernel 240 (e.g., a Linux kernel) of the first OS 220 to thereby display the home screen on the display 434 of the electronic device 101. As another example, when an application is executed on the first OS 220, the electronic device 101 may process data from a particular application based on the driver of the kernel 240 (e.g., a Linux kernel) of the first OS 220 to thereby display the execution screen of the application on the display 434 of the electronic device 101. The first program 201 is not limited thereto but may rather be various programs executable on the first OS 220.

Figures 5A, 5B:
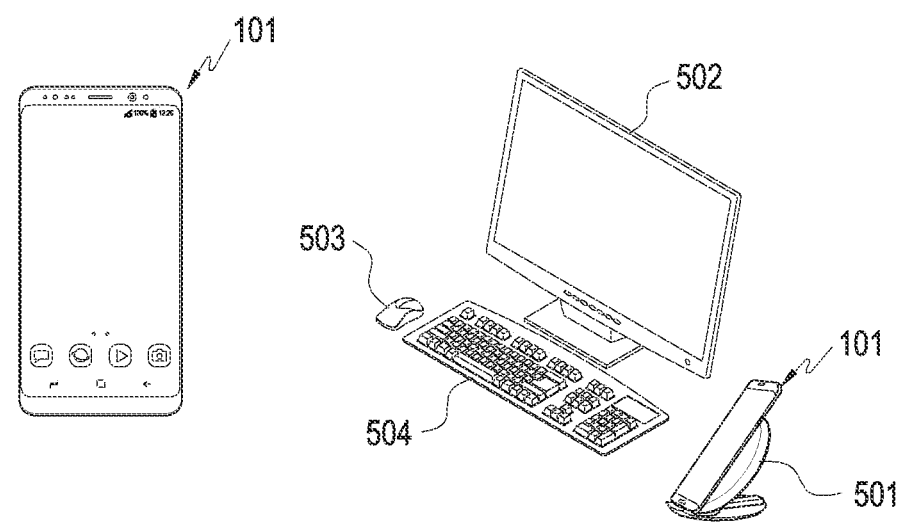
FIGS. 5A and 5B illustrate an example electronic device and an example external electronic device according to an embodiment of the disclosure.

FIGS. 5A and 5B illustrate examples of the electronic device 101 and external electronic devices 502, 503, and 504 according to an embodiment of the disclosure.

Referring to FIGS. 5A and 5B, the electronic device 101 (e.g., at least one processor 120) may control a plurality of hardware units 250 included in the electronic device 101 to process first data from the first program 201. For example, as shown in FIG. 5A, the electronic device 101 may transfer the first data to the display 434 of the electronic device 101 to process the first data so that graphic information related to the first data is displayed through the display 434 of the electronic device 101. As another example, the electronic device 101 may provide the first data through a communication interface of the electronic device 101 to a hub device 501 so that the first data is processed as shown in FIG. 5B. The hub device 501 may perform control to transmit the first data to at least one external device (e.g., the external display 502) among the plurality of external electronic devices 502, 503, and 504 and enable graphic information related to the first data to be displayed on at least one external device. Thus, the method of controlling at least one hardware unit included in an electronic device according to an embodiment may apply to methods of an electronic device to control at least one among a plurality of external devices using the hub device 501. The method of an electronic device to control a plurality of external electronic devices 502, 503, and 504 using the hub device 501 according to an embodiment may apply to methods of controlling at least one hardware unit included in an electronic device.

Operation 303 of the electronic device 101 is described below in greater detail with reference to FIGS. 6 and 7.

Figure 6:
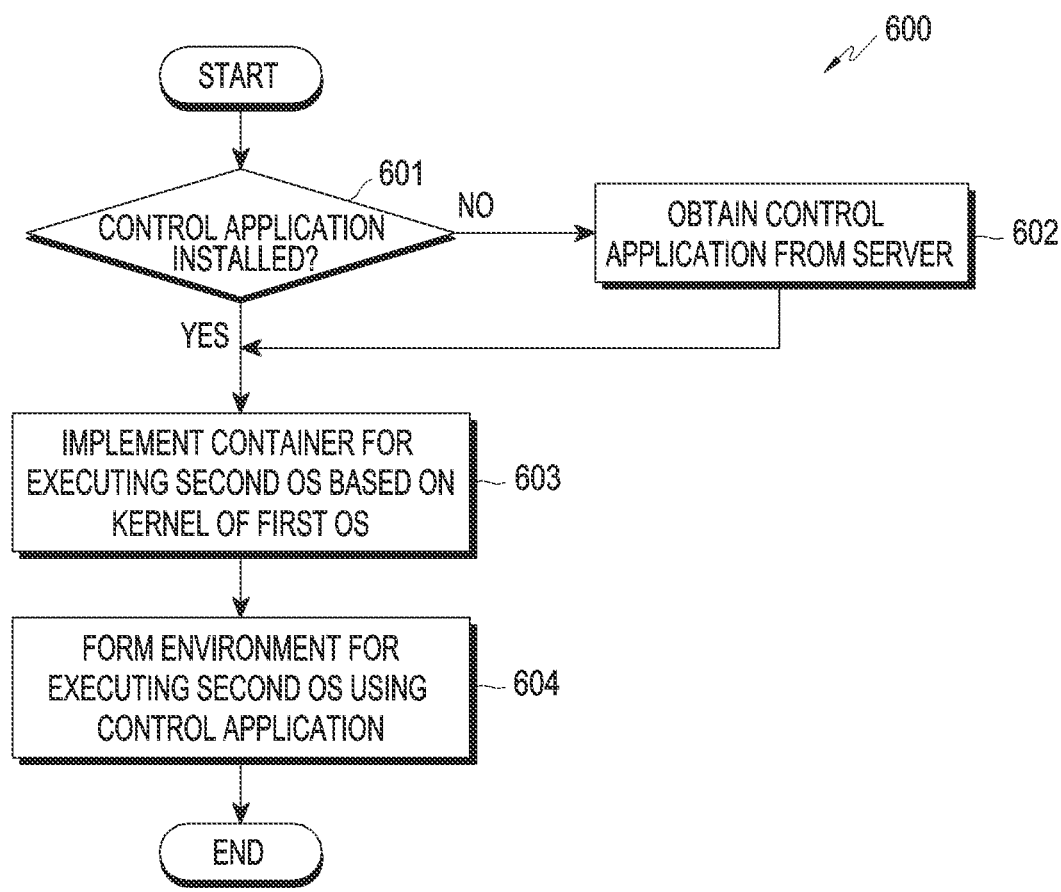
FIG. 6 is a flowchart illustrating an example operation for executing a second OS of an electronic device according to an embodiment of the disclosure.

FIG. 6 is a flowchart 600 illustrating an example operation of executing a second OS 230 of an electronic device 101 according to an embodiment of the disclosure.

Referring to FIG. 6, operations of the electronic device 101 are not limited to the operations of the electronic device 101 shown in FIG. 6 and may be performed in a different order than that shown or some operations may simultaneously be performed. According to an embodiment, other additional operations than the operations of the electronic device 101 shown in FIG. 6 may be performed or some of the operations of the electronic device 101 shown in FIG. 6 may be omitted.

Figure 7:
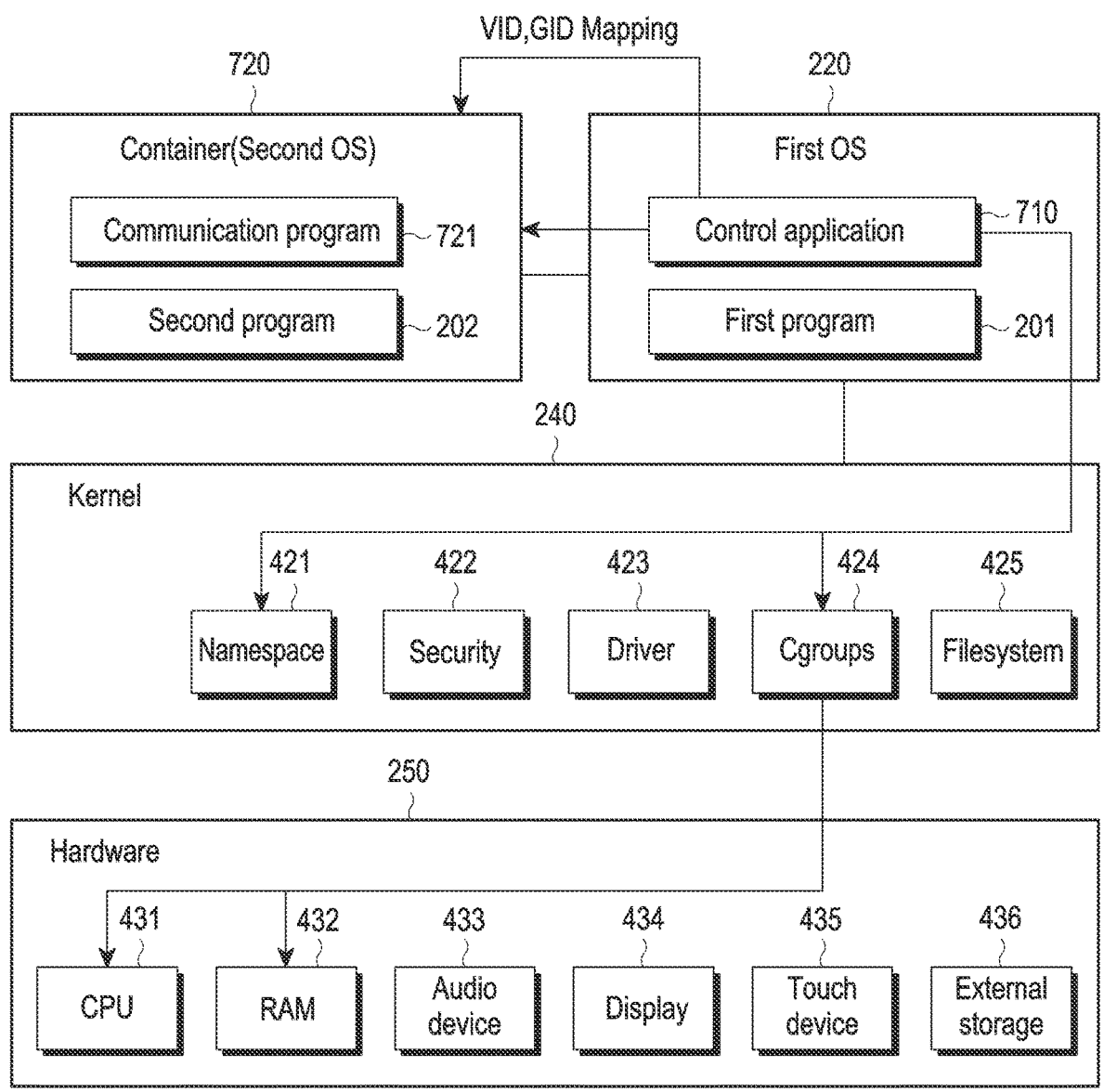
FIG. 7 is a view illustrating an example system structure of an electronic device according to an embodiment of the disclosure.

FIG. 7 is a view illustrating an example system structure of an electronic device 101 according to an embodiment of the disclosure.

Referring to FIG. 7, the electronic device 101 (e.g., at least one processor) may perform operations 601 to 604 of FIG. 6 as, at least, part of operation 303.

According to an embodiment, the electronic device 101 (e.g., at least one processor 120) may identify whether a control application 710 has been installed on the electronic device 101 as in operation 601. For example, the electronic device 101 may identify the control application 710 pre-stored in the memory of the electronic device 101 in the form of a program or instructions. Upon identifying that the control application 710 has not been installed on the electronic device 101, the electronic device 101 may obtain the control application 710 from a server as in operation 602.

For example, the electronic device 101 may access the server providing the control application 710, send a request for the control application 710 to the accessed server, obtain the control application 710 in response to the request for the control application 710, and store the obtained control application 710 in the memory 130 of the electronic device 101. The operation of the electronic device 101 to obtain the control application 710 from the server may be performed with no user input or may be performed according to a user input. For example, the electronic device 101 may notify the user of non-installation of the control application 710 (e.g., display a notification message indicating non-installation of the control application 710 on the display of the electronic device 101), receive a user input for accessing the server providing the control application 710 from the user, receive a user input for downloading the control application 710, and download the control application 710 from the accessed server.

According to an embodiment, the electronic device 101 (e.g., at least one processor 120) may display an execution icon associated with the installed control application 710. For example, the electronic device 101 may allow an execution icon associated with the installed control application 710 to be displayed on the display of the electronic device 101 or on an external display connected with the electronic device 101. For example, the electronic device 101 may display an execution icon to trigger execution of the installed control application 710. The electronic device 101 may execute the control application 710 in response to receiving a user input to select the execution icon. As another example, the electronic device 101 may display an execution icon to vary the execution state of the installed control application 710. For example, the electronic device 101 may display the execution icon to enable the control application 710 executed in the background to be executed in the foreground and, in response to reception of a user input for selecting the execution icon, switch the execution state of the control application 710 from the background to the foreground.

According to an embodiment, the electronic device 101 (e.g., at least one processor 120) may generate a container (e.g., a Linux container) 720 for executing the second OS 230 based on the kernel 240 (e.g., a Linux kernel) of the first OS 220 as in operation 603 as shown in FIG. 6. The electronic device 101 may use the container generation function of the kernel 240 (e.g., a Linux kernel) of the first OS 220. The electronic device 101 may execute at least one or more OSs (e.g., the second OS 230) different from the first OS 220 on the container 720.

According to an embodiment, the electronic device 101 (e.g., at least one processor 120) may execute the second OS 230 on a pre-generated container 720 as described above. The electronic device 101 may already have generated at least one container (not shown) before executing the second OS 230. The electronic device 101 may select one of at least one pre-generated container (not shown) and execute the second OS 230 on the pre-generated container (not shown).

According to an embodiment, corresponding to a user input for selecting execution of a second OS 230-based application (e.g., the second program 202), the control application 710 may allocate and provide data necessary for executing the second OS 230-based application (e.g., the second program 202) through the container 720.

According to an embodiment, the container 720 may be generated not by virtualization but by an isolation technique. For example, when the first OS 220 is running, only the process of the second OS 230 isolated may be processed without any booting process for executing the second OS 230. Thus, since images may be managed and distributed in file units through the container 720 by the control application 710 of the first OS 220, an OS different from the OS currently running may simultaneously be executed at the minimum capacity. Further, according to an embodiment, the container 720 may use the kernel 240 of the first OS 220 which is the host OS and allocate only memory necessary for the application executed based on the second OS 230, thus overcoming the limitations of virtual machines while being able to control heterogeneous OSs without overburdening the performance of the host OS.

According to an embodiment, the kernel 240 may be executed by the Linux kernel of the first OS 220 (e.g., an Android OS) and may generate the container 720 as a Linux container function to drive the guest OS (e.g., the Linux OS) by the control application 710. The kernel 240 may be a program providing various functions for executing the OS. For example, the kernel 240 may include at least one of a namespace function 421 to allocate a process for executing the guest OS related to the first OS 220 to the namespace, a security function 422, a driver function 423 to access each of the plurality of hardware units 250, a Cgroups function 424 to allocate resources to allocate the CPU core or memory capacity, or a file system function 425 to store and manage files.

According to an embodiment, the container 720 may be an environment to drive a virtual OS independently from the first OS 220 and may be a distributed Linux version such as Ubuntu® or Debian created based on the Linux container-supporting kernel. Generation of the container 720 is not limited to the components of FIG. 7 but may also be generated by a Linux namespace container.

The OS (e.g., the second OS 230) different from the first OS 220 executed on the container 720 may be isolated from the first OS 220 of the electronic device 101. In other words, as the second OS 230 is executed on the container 720, the first OS 220 and the second OS 230 may simultaneously be executed on the electronic device 101.

According to an embodiment, generation of the container 720 of the electronic device 101 may be triggered by a designated condition. For example, the control application 710 installed on the electronic device 101 may trigger the first OS 220 of the electronic device 101 to generate the container 720. As an example, when the control application 710 is executed on the electronic device 101, the control application 710 may trigger the first OS 220 to generate the container 720 using the kernel 240 of the first OS 220 in response to execution of the control application 710. Execution of the control application 710 may be performed in response to reception of a user input for executing the control application 710 (e.g., a user input for selecting an execution icon of the control application 710) or when a condition designated for the electronic device 101 is met (e.g., when the electronic device 101 powers on).

According to an embodiment, the second OS 230 executed on the container 720 may include a plurality of communication programs 721 and the second program 202.

According to an embodiment, the plurality of communication programs 721 may transmit data related to the second OS 230 executed on the container 720 to the outside (e.g., the control application 710 of the first OS 220) via socket communication. Accordingly, the first OS 220 may obtain data related to the second OS 230 isolated and executed from at least some of the plurality of communication programs 721 and deal with a process related to the second OS 230 based on the obtained data related to the second OS 230. The plurality of communication programs 721 are not limited thereto but may transmit the data related to the second OS 230 to the outside of the container 720 in a communication method capable of transmitting data to the outside of the container 720 other than socket communication. Each of the plurality of communication programs 721 may transmit a different type of data (e.g., graphic data or audio data). For example, the plurality of communication programs 721 may include a first communication program (e.g., virtual network computing (VNC) capable of transmitting graphic-related data to the outside of the container 720 and a second communication program (e.g., PulseAudio) capable of transmitting audio information-related data to the outside of the container 720. The plurality of communication programs 721 are not limited to those described herein but may include communication programs capable of transmitting data related to other various types of information than graphic-related data or audio-related data to the outside of the container 720.

According to an embodiment, the second program 202 may be a program executed based on the language of the second OS 230. For example, the second program 202 may be a program to display the execution screen of the second OS 230 (e.g., a Linux OS) executed based on the language (e.g., a Linux language) of the second OS 230 or a package program (e.g., a Linux package) distributed from the external server to be executable on the second OS 230. The Linux package may include, e.g., Firefox or Gimp.

According to an embodiment, the electronic device 101 (e.g., at least one processor 120) may form an environment for executing the second OS 230 using the control application 710 as in operation 604. For example, the electronic device 101 may allocate the container 720 generated based on the namespace function 421 of the first OS 220 to a first namespace using the control application 710 as shown in FIG. 6. Thus, the container 720 allocated to the first namespace and the second OS 230 executed on the container 720 may be processed by the electronic device 101 separately from the first OS 220.

The electronic device 101 may set an authority for the first namespace. As an example, the electronic device 101 may set an authority to allow the second OS 230 executed on the container 720 to access the external electronic device via the electronic device 101. As another example, the electronic device 101 may set an authority to allow the second OS 230 executed on the container 720 to access the network via the electronic device 101. The control application 710 may map the user ID (UID) and group ID (GID) of processes generated in the first namespace allocated to the second OS 230 to at least one namespace allocated to the first OS 220 permitted to access the network. Accordingly, the second OS 230 may use the network set for the electronic device 101 using a network adaptor (not shown) of the electronic device 101, a network function (not shown) of the kernel 240, and the namespace allocated to the first OS 220 through the control application. As another example, the electronic device 101 may allocate at least some of the system resources of the electronic device 101 for executing the second OS 230 based on the Cgroups function 424 of the kernel 240 of the first OS 220 using the control application 710 as shown in FIG. 6. As an example, the electronic device 101 may allocate at least part of the CPU and the memory which are available for the container 720 using the control application 710. Thus, the second OS 230 may be executed based on the at least part, allocated, of the CPU and memory.

Operations 304 to 306 of the electronic device 101 are described below in greater detail with reference to FIGS. 8 to 10.

Figure 8:
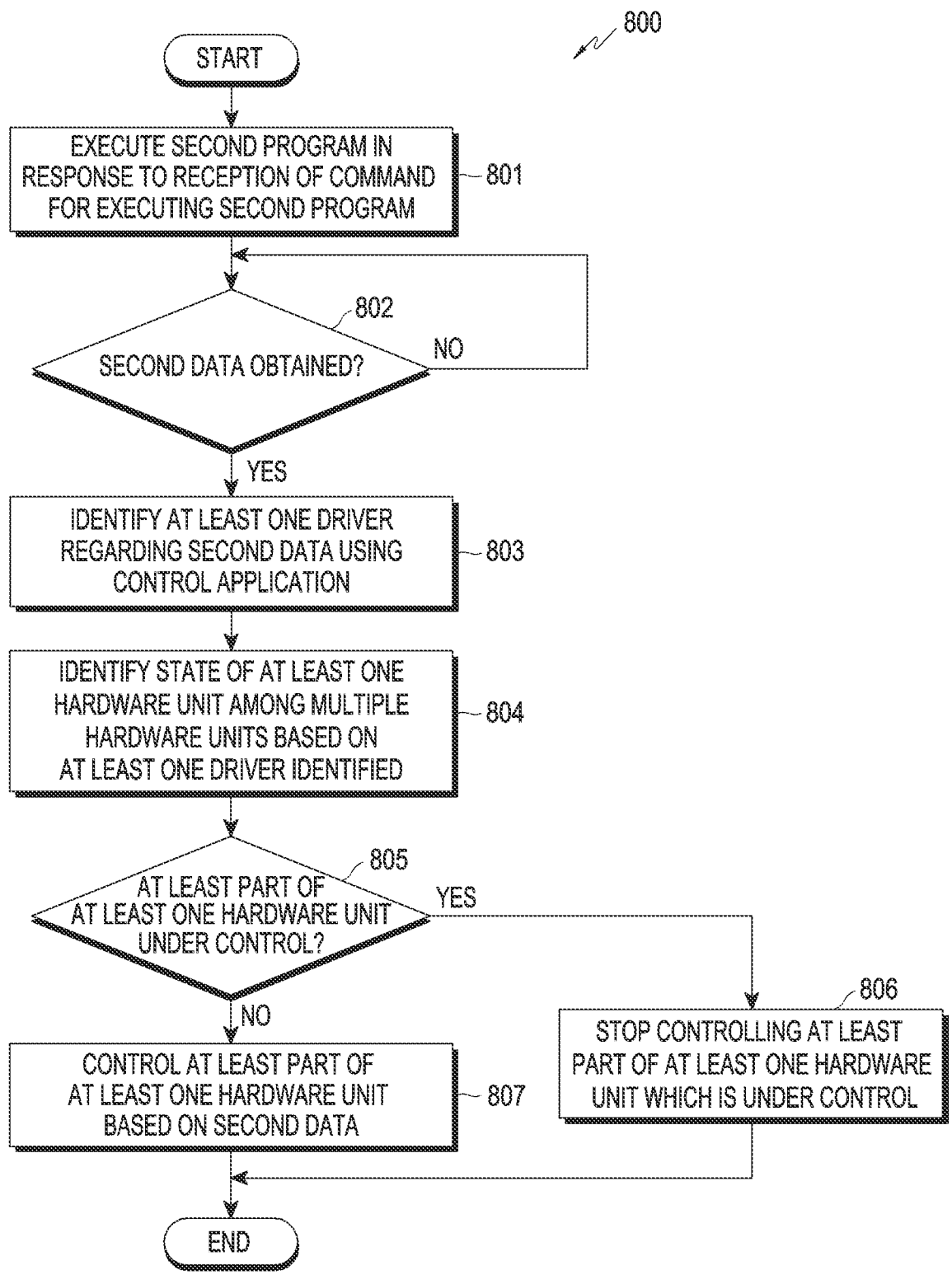
FIG. 8 is a flowchart illustrating an example operation of controlling a second program executed on a second OS of an electronic device according to an embodiment of the disclosure.

FIG. 8 is a flowchart 800 illustrating an example operation of controlling the second program 202 executed on the second OS of the electronic device 101 according to an embodiment of the disclosure.

Referring to FIG. 8, operations of the electronic device 101 are not limited to the operations of the electronic device 101 shown in FIG. 8 and may be performed in a different order than that shown or some operations may simultaneously be performed. According to an embodiment, other additional operations than the operations of the electronic device 101 shown in FIG. 8 may be performed or some of the operations of the electronic device 101 shown in FIG. 8 may be omitted.

Figure 9:
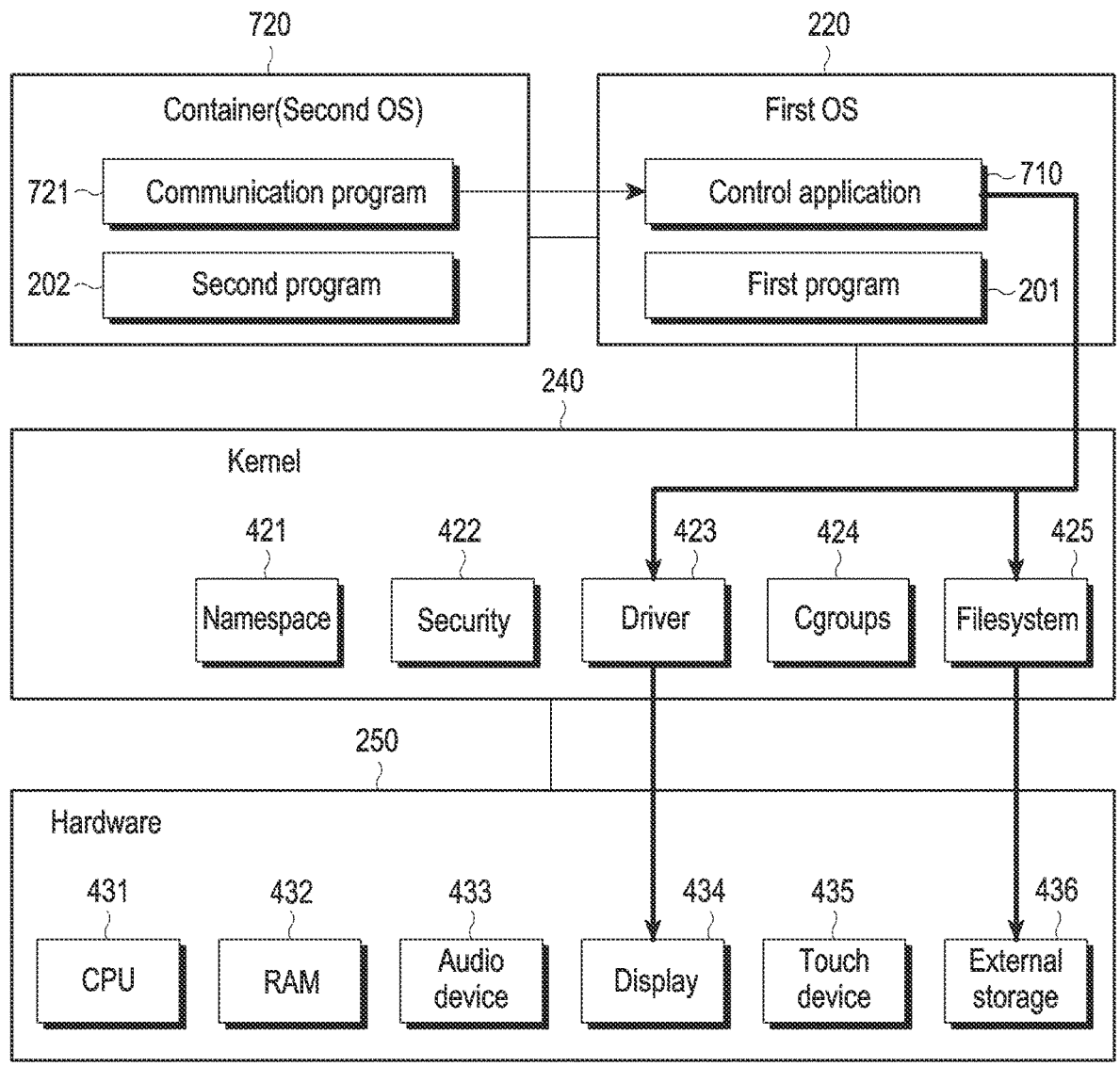
FIG. 9 is a view illustrating an example system structure of an electronic device according to an embodiment of the disclosure.

FIG. 9 is a view illustrating an example system structure of an electronic device 101 according to an embodiment of the disclosure.

Figure 10:
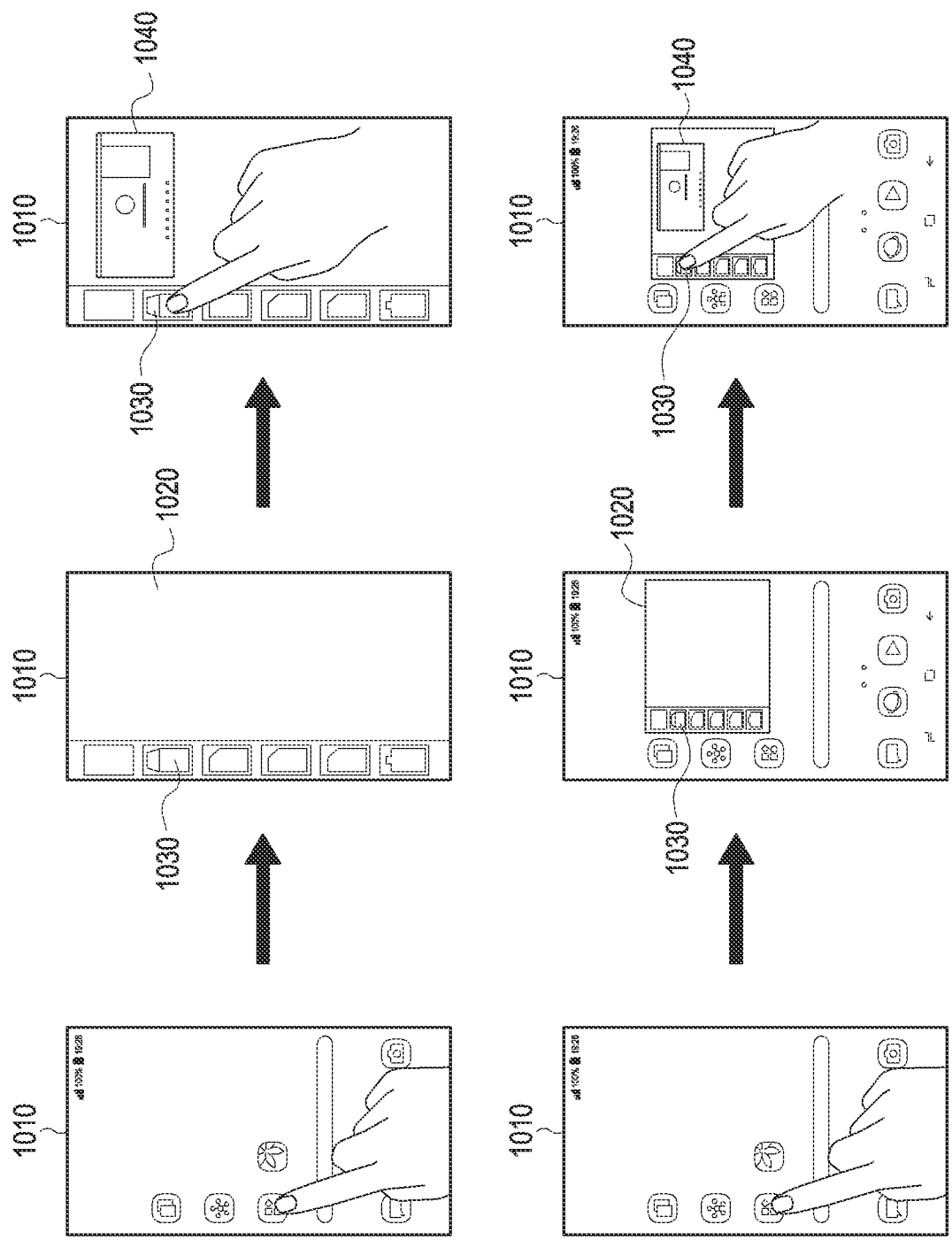
FIG. 10 is a view illustrating an example screen displayed on an external display connected with an electronic device or an example screen displayed on a display of the electronic device according to an embodiment of the disclosure.

FIG. 10 is a view illustrating an example screen displayed on an external display connected with an electronic device 101 or an example screen displayed on a display of the electronic device 101 according to an embodiment of the disclosure.

According to an embodiment, the electronic device 101 (e.g., at least one processor) may perform operations 801 to 807 of the electronic device 101 shown in FIG. 8 as, at least, part of operations 304 to 306.

According to an embodiment, the electronic device 101 (e.g., at least one processor 120) may execute the second program 202 in response to reception of a command for executing the second program 202 in operation 801. For example, referring to FIG. 10, the electronic device 101 may receive a user input for selecting an execution icon associated with the control application 710 and execute the second program 202 for displaying the execution screen 1020 of the second OS in response to reception of a user input for selecting the execution icon. The electronic device 101 may display the execution screen 1020 of the second OS in response to execution of the second program 202. Referring to FIG. 10, the execution screen 1020 of the second OS may be displayed on the whole area 1010 of a display (e.g., the display 434 of the electronic device 101 or an external display connected with the electronic device 101) or in the form of a window displayed on a portion of the display. For example, the electronic device 101 may receive a user input to select icons 1030 (e.g., an icon for executing the Linux package) for executing the second program 202 on the execution screen 1020 of the second OS or displaying the execution screen 1040 of the second program 202 on the execution screen 1020 of the second OS.

According to an embodiment, the electronic device 101 (e.g., at least one processor 120) may identify whether second data related to the executed second program 202 is obtained in operation 802. Referring to FIG. 9, the communication programs 721 may obtain the second data related to the second program 202 from at least some of a plurality of communication programs 721 of the second OS 230. When the second program 202 is executed on the second OS 230, the second data related to the second program 202 may be generated in the second OS 230. At least some of the plurality of communication programs 721 of the second OS 230 may obtain the second data related to the second program 202 and transfer the obtained second data related to the second program 202 to the control application 710 of the first OS 220 via socket communication. At least some of the plurality of communication programs 721 to send at least part of the second data related to the second program 202 to the outside of the container 720 may be identified from the second OS 230 according to the data type (e.g., graphic information-related data or audio information-related data) of at least part of the second data related to the second program 202. For example, a first communication program (e.g., VNC) among the plurality of communication programs 721 may transmit at least part of the second data related to graphic information to the control application 710, and a second communication program (e.g., PulseAudio) among the plurality of communication programs 721 may transmit at least another part of the second data related to audio information to the control application 710.

According to an embodiment, in response to obtaining the second data by the control application 710, the electronic device 101 (e.g., at least one processor 120) may identify at least one driver regarding the second data of the kernel 240 (e.g., a Linux kernel) of the first OS 220 using the control application 710 in operation 803. For example, the electronic device 101 may identify the graphic driver of the kernel 240 (e.g., a Linux kernel) of the first OS 220 corresponding to at least part of the second data related to graphic information and identify the audio device driver of the kernel 240 (e.g., a Linux kernel) of the first OS 220 corresponding to at least another part of the second data related to audio information. As another example, when an external electronic device is connected to the electronic device 101, the electronic device 101 may identify an input/output interface driver (e.g., a universal serial bus (USB) control driver) of the kernel 240 (e.g., a Linux kernel) of the first OS to identify the input/output interface (e.g., 177 or 178) to connect to a hub device connectable to the external electronic device or transferring the second data to the external electronic device.

According to an embodiment, in operation 804, the electronic device 101 (e.g., at least one processor 120) may identify the state of at least one hardware unit (e.g., the second hardware unit) among the plurality of hardware units 250 included in the electronic device 101 based on at least one driver identified using the control application 710. In other words, the electronic device 101 may identify the state of at least one hardware unit among the plurality of hardware units 250 for processing the second data using the control application 710. For example, as shown in FIG. 9, the electronic device 101 may identify the state of the display (e.g., the display state of at least a portion of the display) based on the graphic driver identified using the control application 710 or identify the state of the audio device (e.g., the output state of the audio device) using the identified audio driver. As another example, the electronic device 101 may identify whether the electronic device 101 may access the external electronic device via the input/output interface based on the input/output interface driver identified using the control application 710.

According to an embodiment, the electronic device 101 (e.g., at least one processor 120) may identify whether at least part of at least one hardware unit (e.g., the second hardware unit) is controlled based on the state of at least one hardware unit identified using the control application 710 in operation 805. For example, the electronic device may identify whether at least part of at least one hardware unit is controlled (e.g., whether at least part of at least one hardware unit is controlled according to the first data from the first program 201) in relation to the first OS 220 based on the identified state of the at least one hardware unit. In other words, the electronic device 101 may identify the resource allocation state of at least one hardware unit in relation to the first OS 220. As an example, the electronic device 101 may identify whether the execution screen of the first program 201 being executed on the first OS 220 is being displayed on at least a portion of the display based on the identified display state of, at least, the portion of the display. For example, the electronic device 101 may identify whether an audio related to execution of the first program 201 is being output via the audio device based on the identified audio output state of the audio device. As set forth above, the electronic device 101 may identify the hardware resource allocation state regarding the first OS 220 (e.g., the hardware resource allocation state for the first program 201) before allocating resources for the second OS 230, thereby preventing conflicts between resources allocated to the second OS 230 and hardware resources allocated to the first OS 220.

According to an embodiment, the electronic device 101 (e.g., at least one processor 120) may stop controlling at least part of the at least one hardware unit in response to identifying that at least part of at least one hardware unit is being controlled in operation 806. In other words, when at least part of at least one hardware resource has been allocated, the electronic device 101 may recover the at least part allocated of the at least one hardware resource. For example, when the execution screen of the first program 201 is displayed on at least a portion of the display, the electronic device 101 may perform control to stop display of the execution screen of the first program 201 on at least the portion of the display. As another example, when the audio device outputs audio related to the first program 201, the electronic device 101 may control the audio device to stop outputting the audio related to the first program 201.

According to an embodiment, in operation 807, the electronic device 101 (e.g., at least one processor 120) may control at least part of at least one hardware unit identified based on the second data obtained using the control application 710. In other words, the electronic device 101 may allocate at least the recovered part of the at least one hardware resource to the second program 202 being executed on the second OS 230 using the control application 710. For example, the electronic device 101 may allow at least part of the execution screen of the second program 202 to be displayed on at least a portion of the display stopped from displaying the execution screen of the first program 201 and allow at least another part of the execution screen of the second program 202 to be displayed on at least another portion of the display. Thus, the execution screen of the first program 201 being executed on the first OS 220 and the execution screen of the second program 202 being executed on the second OS 230 may simultaneously be displayed on the display of the electronic device 101. As another example, the electronic device 101 may output the audio related to the second program 202 via the audio device which has been stopped from outputting the audio related to the first program 201. By operation 807 of the electronic device 101 as described above, the first program 201 executed on the first OS 220 and the second program 202 executed on the second OS 230 may simultaneously be executed, thereby leading to more availability of the electronic device 101.

Operation 807 of the electronic device 101 is described below with reference to FIG. 11.

Figure 11:
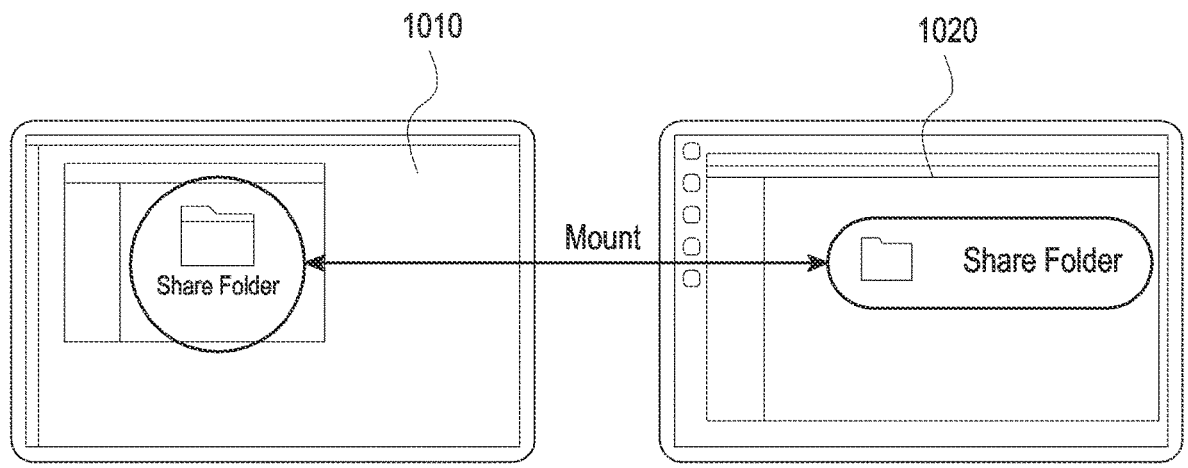
FIG. 11 is a view illustrating a screen of an electronic device or a screen of an external electronic device according to an embodiment of the disclosure.

FIG. 11 is a view illustrating a screen of an electronic device 101 according to an embodiment of the disclosure.

Referring to FIG. 11, the electronic device 101 (e.g., at least one processor 120) may simultaneously perform programs which perform the same or similar functions on the first OS 220 and the second OS 230. For example, the electronic device 101 may simultaneously execute a first program 201 (e.g., a gallery program) which provides a first function on the first OS 220 and a second program 202 (e.g., a Gimp program) which provides a second function similar to the first function on the second OS 230 as shown in FIG. 11. The electronic device 101 may display the execution screen of the first program 201 executed on the first OS 220 and the execution screen of the second program 202 executed on the second OS 230 to overlap each other on the display of the electronic device 101. The execution screen of the first program 201 may include an object (e.g., a thumbnail of a stored image 1201) related to the first program 201 (e.g., a gallery program), and the execution screen of the second program 202 may include an object (e.g., a FIG. 1202 drawn according to a user input) related to the second program 202 (e.g., a Gimp program). As the programs providing the same or similar functions are executed on the first program 201, and the second program 202 is available on the electronic device at the same time, cooperation between the first OS 220 and the second OS 230 is possible, giving more convenience to the user.

Without being limited thereto, the electronic device 101 may simultaneously execute programs which perform different functions, rather than the same or similar functions, on the first OS 220 and the second OS 230.

Without being limited thereto, it is also possible to control at least one other hardware unit (e.g., a hardware resource such as a microphone or camera or an external electronic device, e.g., a keyboard, mouse, or printer, which may be used connected with the display) included in the electronic device in a similar manner to the embodiment of display or audio output related to the second program 202 of the second OS.

Figure 12:
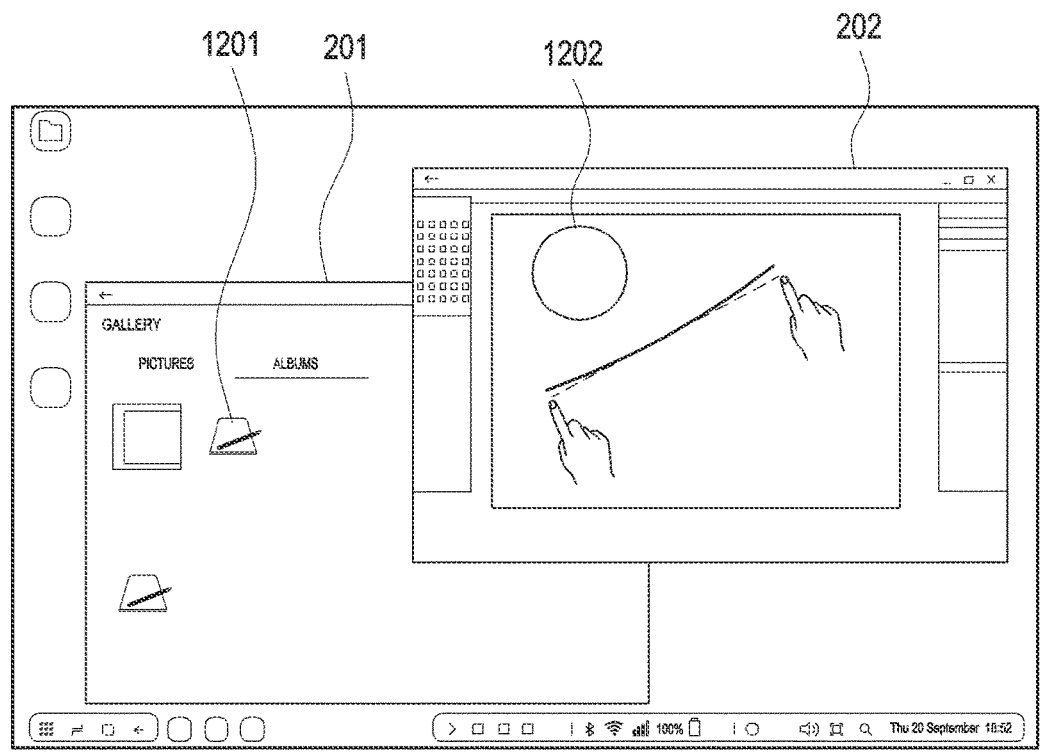
FIG. 12 is a view illustrating an example method of controlling an electronic device to allow a first OS and a second OS to share an external storage device connected with the electronic device according to an embodiment of the disclosure.

Referring to FIG. 12, the operation in which the first OS 220 and the second OS 230 share the external storage device 436 connected to the electronic device is described below with reference to FIG. 12.

FIG. 12 is a view illustrating an example method of controlling an electronic device to allow the first OS 220 and the second OS 230 to share the external storage device 436 connected to the electronic device 101 according to an embodiment of the disclosure.

Referring to FIG. 12, when the external storage device 436 is connected to the electronic device 101, the first OS may mount the external storage device 436 onto the file system 425 of the kernel 240 (e.g., a Linux kernel) and access it. At this time, the control application may access the file system 425 of the first OS 220 and transfer data regarding the external storage device through the file system 425 to the second OS 230 as shown in FIG. 11. Accordingly, the second OS 230 may access the external storage device 436 connected to the electronic device 101 and use data stored in the external storage device 436. For example, the second OS 230 may execute at least one program executable on the second OS 230 and stored in the external storage device 436. As another example, as shown in FIG. 12, a designated directory of the external storage device 436 may be mounted from the second OS 230 so that the first OS 220 and the second OS 230 may use the designated directory of the external storage device 436 as shared folders 1210 and 1211. The designated directory may be displayed as an execution screen of the first shared folder 1210 on the execution screen of the first OS 220 and as an execution screen of the second shared folder 1211 on the execution screen of the second OS 230. In response to reception of a user input to move a file or program to the execution screen of the first shared folder 1210 or the execution screen of the second shared folder 1211, the electronic device 101 (e.g., at least one processor 120) may allow the file or program to be shared between the first OS 220 and the second OS 230 via the designated directory.

Described above are operations 301 to 306 to execute the first OS 220 and the second OS 230.

Described below are various embodiments of methods of controlling the electronic device 101 to execute the first OS 220 and the second OS 230.

According to an embodiment, the electronic device 101 (e.g., at least one processor 120) may obtain data related to the second program 202 executed on the second OS 230 through at least one hardware device and transfer the obtained data to the second OS 230 so that the obtained may be processed by the second OS 230.

Figure 13:
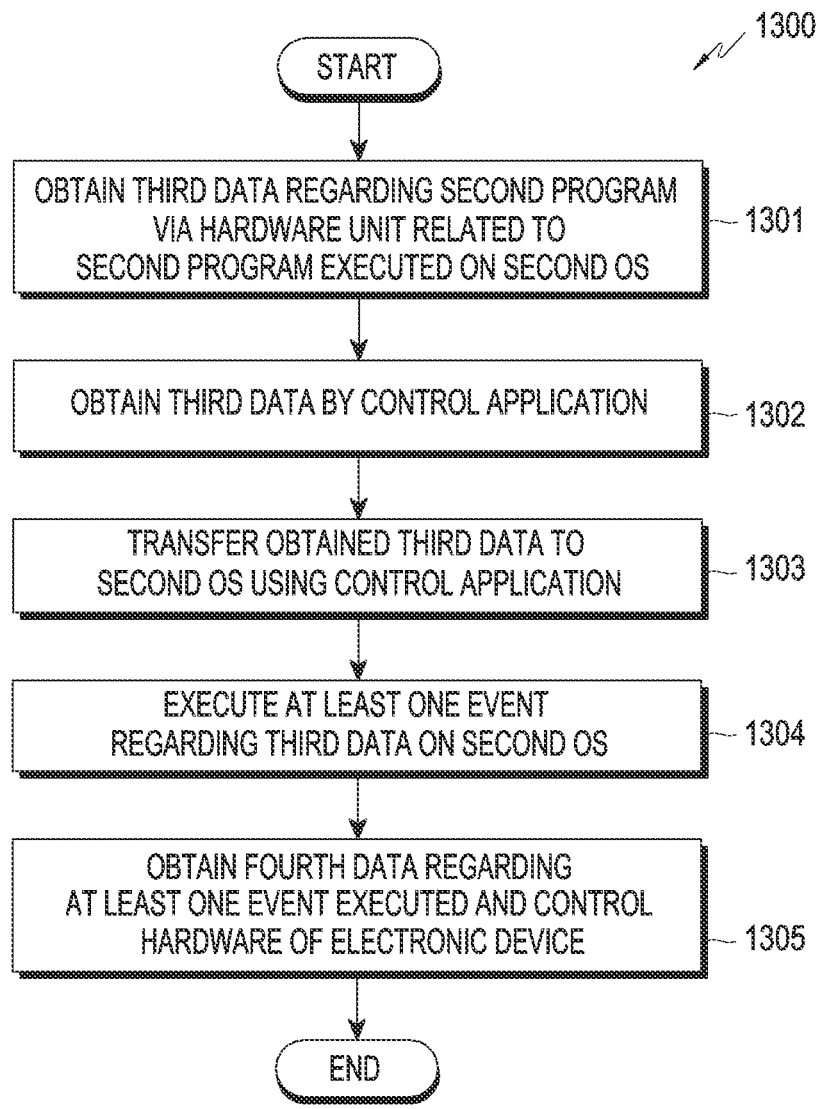
FIG. 13 is a flowchart illustrating an example operation of obtaining data related to a second program of an electronic device and transferring the obtained data to a second OS according to an embodiment of the disclosure.
Figure 14:
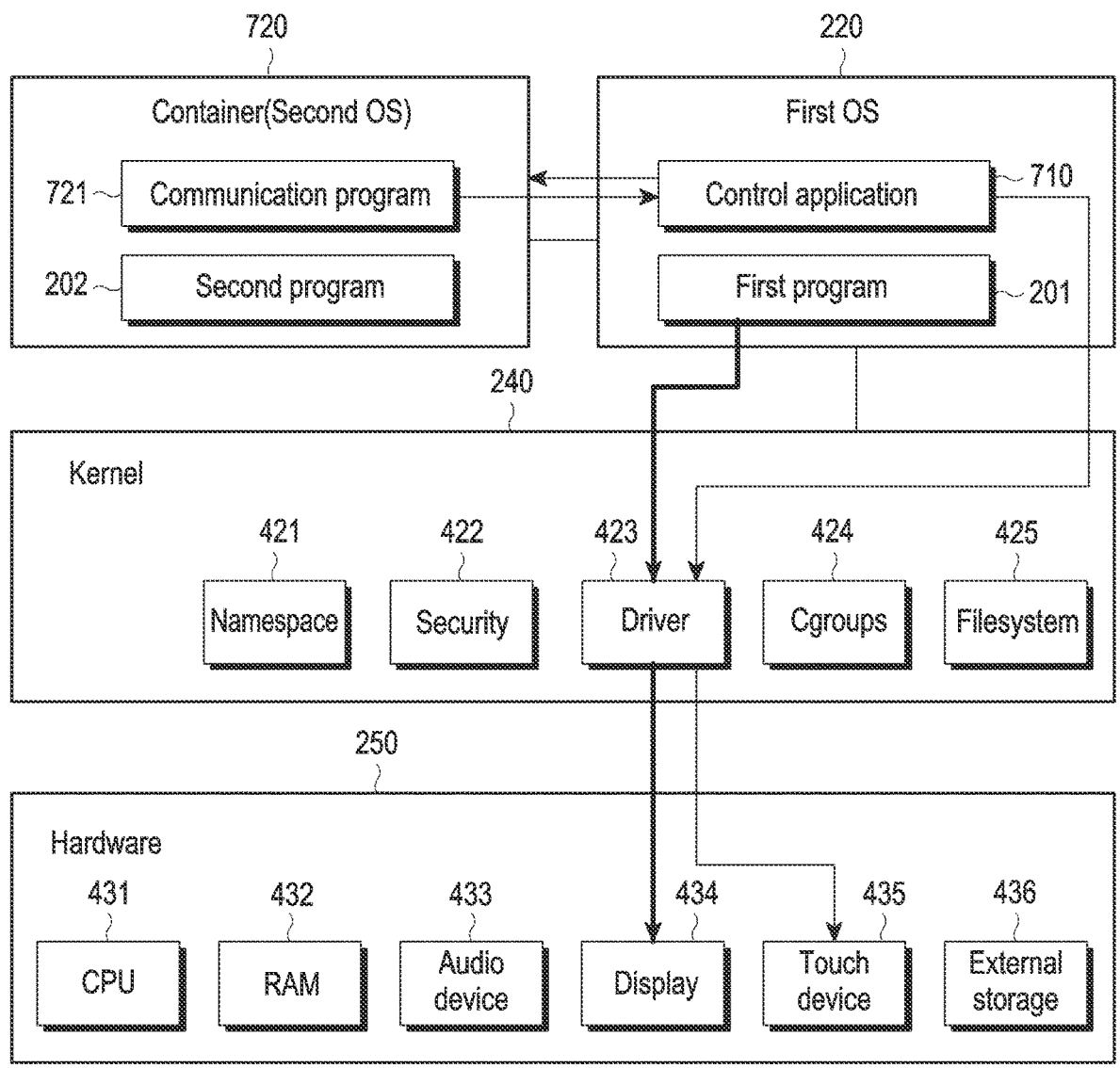
FIG. 14 is a view illustrating an example system structure of an electronic device according to an embodiment of the disclosure.
Figure 15:
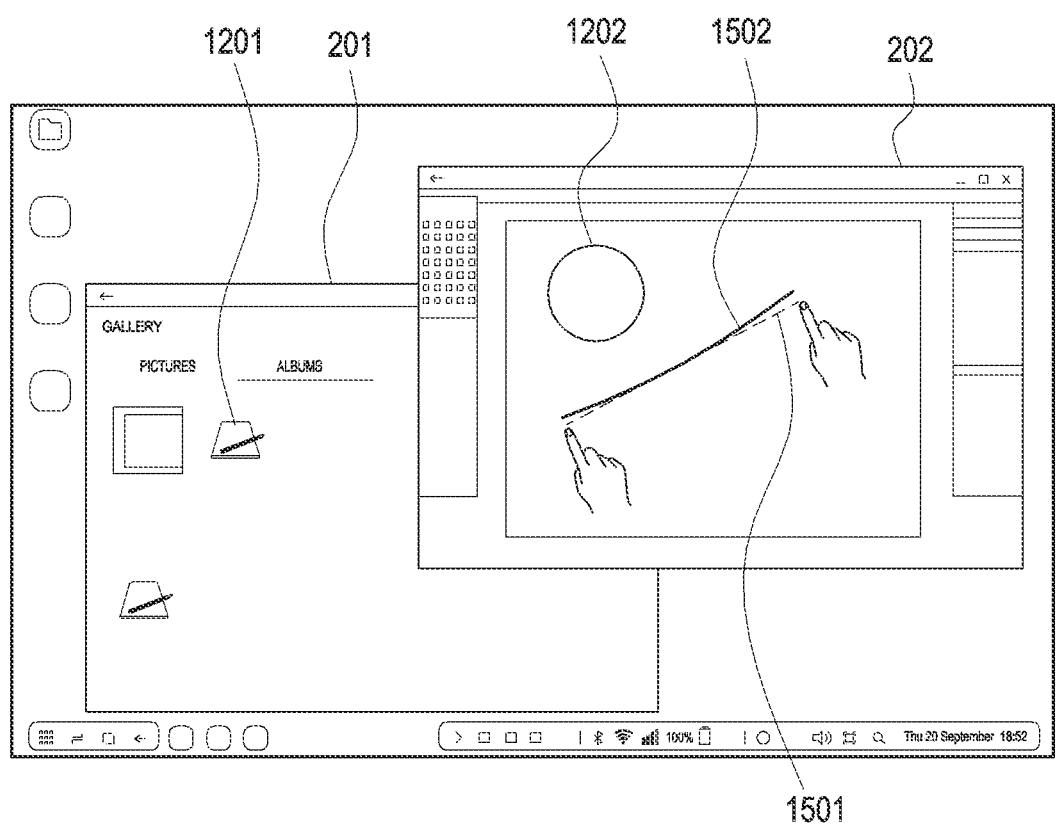
FIG. 15 is a view illustrating execution screens of a first program and a second program according to an embodiment of the disclosure.

Now described with reference to FIGS. 14 and 15 are a series of operations of the electronic device 101 to obtain data related to the second program 202 executed on the second OS 230 through at least one hardware device and transfer the obtained data to the second OS 230 so that the obtained data may be processed by the second OS 230 as described above in connection with FIG. 13.

FIG. 13 is a flowchart 1300 illustrating an example operation of obtaining data related to a second program 202 of an electronic device 101 and transferring the obtained data to a second OS according to an embodiment of the disclosure.

Referring to FIG. 13, operations of the electronic device 101 are not limited to the operations of the electronic device 101 shown in FIG. 13 and may be performed in a different order than that shown or some operations may simultaneously be performed. According to an embodiment, other additional operations than the operations of the electronic device 101 shown in FIG. 13 may be performed or some of the operations of the electronic device 101 shown in FIG. 13 may be omitted.

FIG. 14 is a view illustrating an example system structure of an electronic device 101 according to an embodiment of the disclosure.

FIG. 15 is a view illustrating execution screens of a first program 201 and a second program 202 according to an embodiment of the disclosure.

Referring to FIG. 14, the control application 710 of the electronic device 101 may obtain third data regarding the second program 202 through at least one hardware unit related to the second program 202 executed on the second OS 230 in operation 1301 as shown in FIG. 14. For example, the electronic device 101 may receive a user input through at least a portion of the touchscreen 434 displaying the execution screen of the second program 202 and obtain the third data related to the received user input. As an example, the electronic device 101 may receive the third data regarding the user's drag input 1501 on at least a portion of the touchscreen 434 displaying the execution screen of the second program 202 being executed on the second OS 230. As another example, the electronic device 101 may receive the third data regarding the user's touch input for selecting a text input box displayed on at least a portion of the execution screen of the second program 202 being executed on the second OS 230. Without being limited thereto, the electronic device 101 may obtain the third data regarding the second program 202 through other various hardware units than the touchscreen 434.

According to an embodiment, the control application 710 may obtain the third data obtained through at least one hardware unit via the kernel (e.g., a Linux kernel) of the first OS 220 in operation 1302.

According to an embodiment, the electronic device 101 (e.g., at least one processor 120) may transfer the obtained third data to the second OS 230 using the control application 710 in operation 1303.

According to an embodiment, the second OS 230 may execute at least one event regarding the obtained third data in operation 1304. For example, referring to FIG. 15, the second program 202 of the second OS 230 may execute an event of generating a third object 1502 (e.g., a line) in response to receiving the third data regarding the user's drag input on at least a portion of the touchscreen 434 displaying the execution screen of the second program 202 executed on the second OS 230. As another example, the second program 202 of the second OS 230 may generate a text input focus in response to receiving the third data regarding a touch on the text input box displayed on at least a portion of the execution screen of the second program 202 executed on the second OS 230.

According to an embodiment, the electronic device 101 (e.g., at least one processor 120) may obtain fourth data regarding at least one event executed by the control application 710 from at least some of the plurality of communication programs 721 of the second OS 230 and control at least one hardware unit regarding the obtained fourth data. For example, referring to FIG. 15, in operation 1305, the electronic device 101 may obtain the fourth data regarding an event for generating the third object 1502 from at least some (e.g., VNC) of the plurality of communication programs 721 of the second OS 230 and control at least a portion of the display of the electronic device 101 to display the third object 1502.

Without being limited thereto, it is also possible to control at least one other hardware unit (e.g., a hardware resource such as a microphone, camera, or audio device or an external electronic device, e.g., a keyboard, mouse, or printer which may be used connected with the display) included in the electronic device in a similar manner to the embodiment of display output related to a third program 1701.

Described below are various embodiments of methods of controlling the electronic device 101 to execute the first OS 220 and the second OS 230.

According to an embodiment, the electronic device 101 (e.g., at least one processor 120) may obtain data related to the second program 202 executed on the second OS 230 through at least one hardware device, identify an event regarding the data obtained in the first OS 220, and execute the identified event on the first OS 220.

Figure 17:
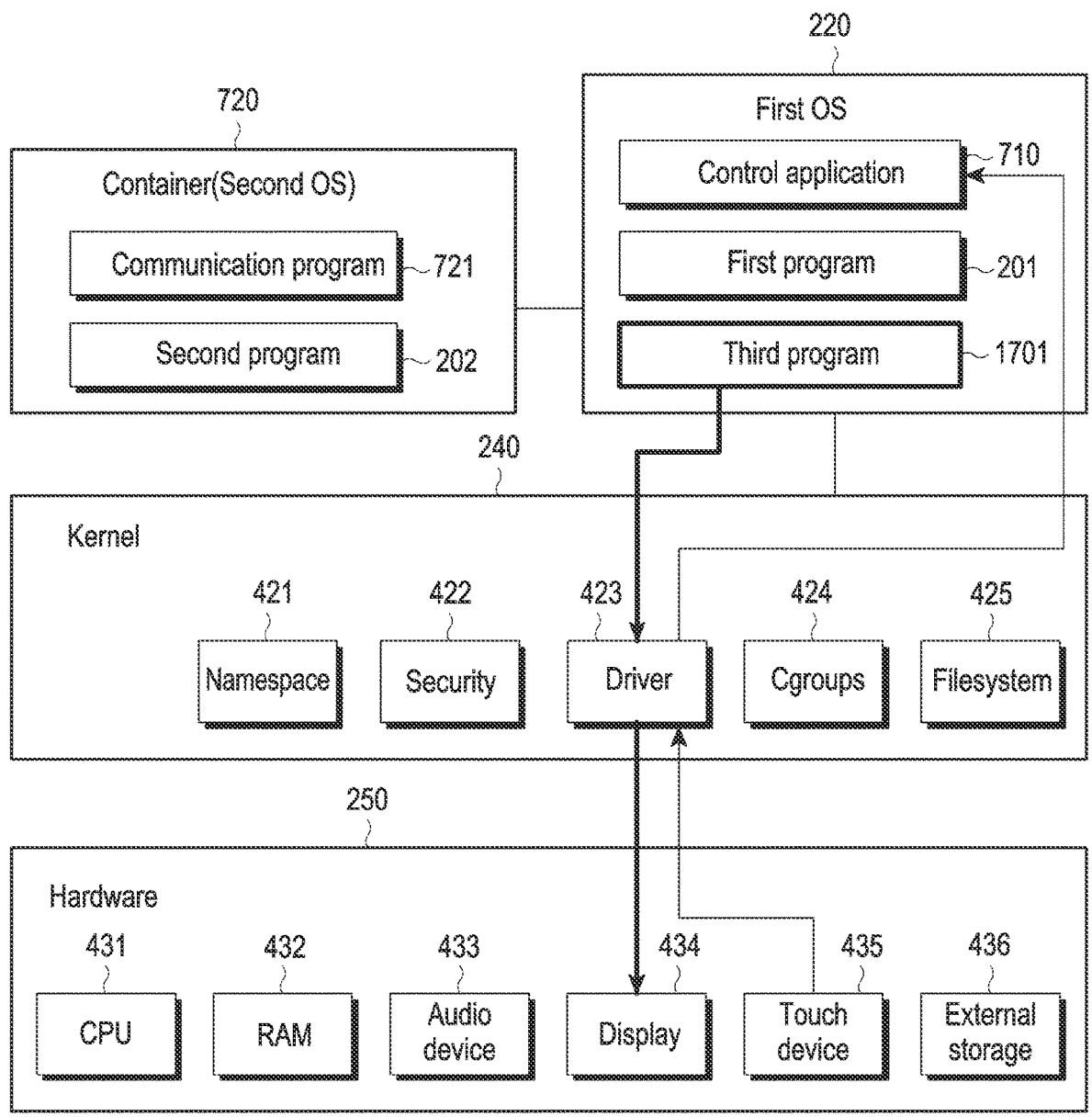
FIG. 17 is a view illustrating an example system structure of an electronic device according to an embodiment of the disclosure.

Described below with reference to FIG. 17 are a series of operations of the electronic device 101 to obtain data related to the second program 202 through at least one hardware device, identify an event regarding the data obtained in the first OS 220, and execute the identified event on the first OS 220.

Figure 16:
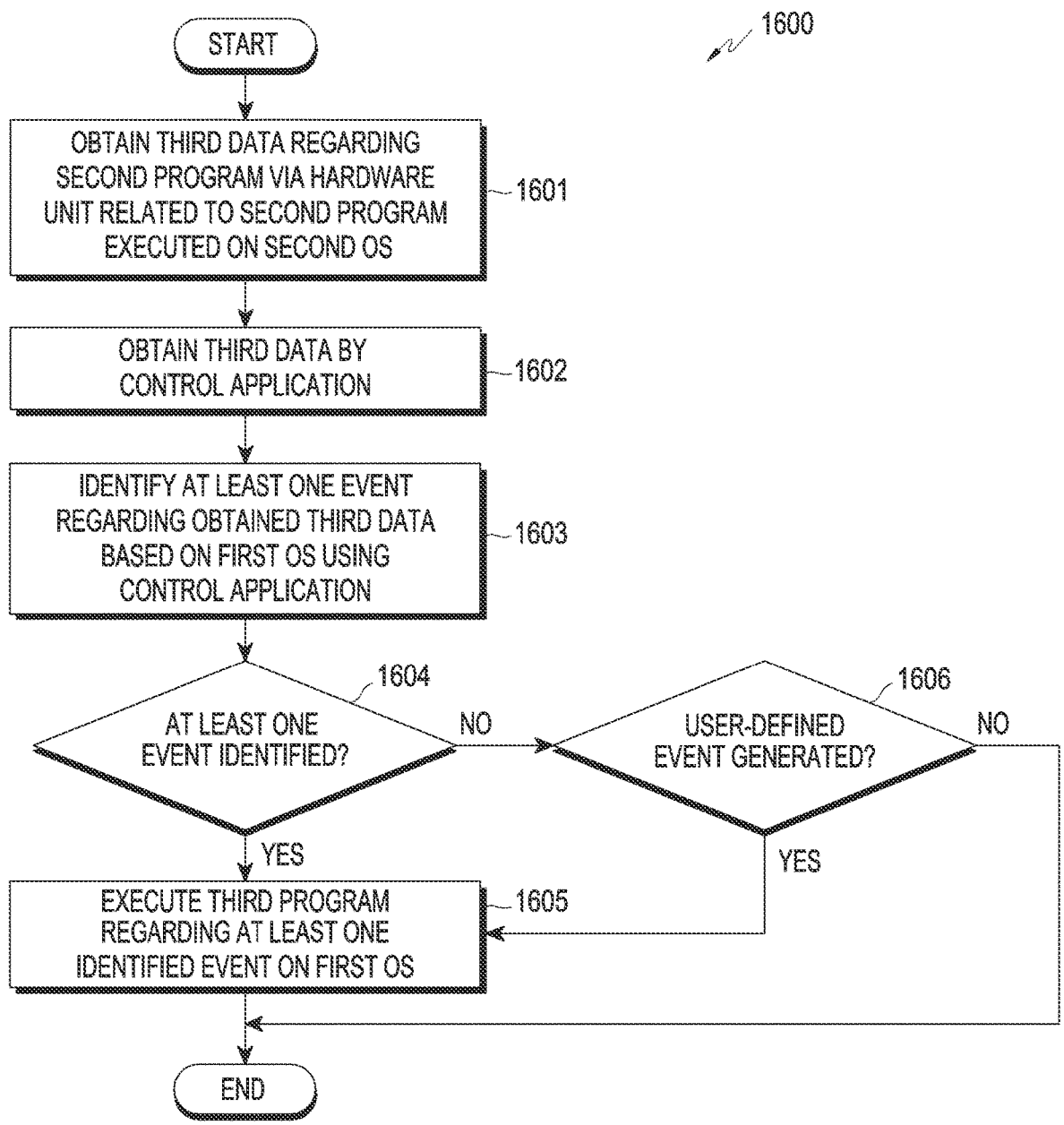
FIG. 16 is a flowchart illustrating an example operation of an electronic device to obtain data related to a second program and executing an event related to the obtained data as identified by a first OS according to an embodiment of the disclosure.

FIG. 16 is a flowchart 1600 illustrating an example operation of an electronic device 101 to obtain data related to a second program 202 and executing an event related to the obtained data as identified by a first OS 220 according to an embodiment of the disclosure.

Referring to FIG. 16, operations of the electronic device 101 are not limited to the operations of the electronic device 101 shown in FIG. 16 and may be performed in a different order than that shown or some operations may simultaneously be performed. According to an embodiment, other additional operations than the operations of the electronic device 101 shown in FIG. 16 may be performed or some of the operations of the electronic device 101 shown in FIG. 16 may be omitted.

FIG. 17 is a view illustrating an example system structure of an electronic device 101 according to an embodiment of the disclosure.

Referring to FIG. 17, in operation 1601, the electronic device 101 (e.g., at least one processor 120) may obtain third data regarding the second program 202 through a hardware unit related to the second program 202 executed on the second OS 230 and, in operation 1602, may obtain the third data by the control application 710. Since operations 1601 and 1602 may be performed in a similar manner to operations 1301 and 1302 described above, what overlaps the description of operations 1301 and 1302 is excluded from the description of operations 1601 and 1602.

According to an embodiment, in operation 1603, the electronic device 101 (e.g., at least one processor 120) may identify at least one event regarding the third data obtained based on the first OS 220 using the control application 710. For example, the electronic device 101 may identify information regarding a plurality of events stored in relation to the first OS 220 using the control application 710 and identify at least one piece of event information (e.g., information regarding an event of touching on the text box) corresponding to the obtained third data (e.g., the third data regarding a touch on the text box displayed on at least a portion of the execution screen of the second program 202) of information about, at least, the plurality of identified events.

According to an embodiment, the electronic device 101 (e.g., at least one processor 120) may identify whether at least one event is identified in operation 1604.

According to an embodiment, in response to identifying at least one event, the electronic device 101 (e.g., at least one processor 120) may, in operation 1605, execute a third program 1701 (e.g., a soft input panel (SIP)) regarding at least the identified event as shown in FIG. 17.

Figure 18:
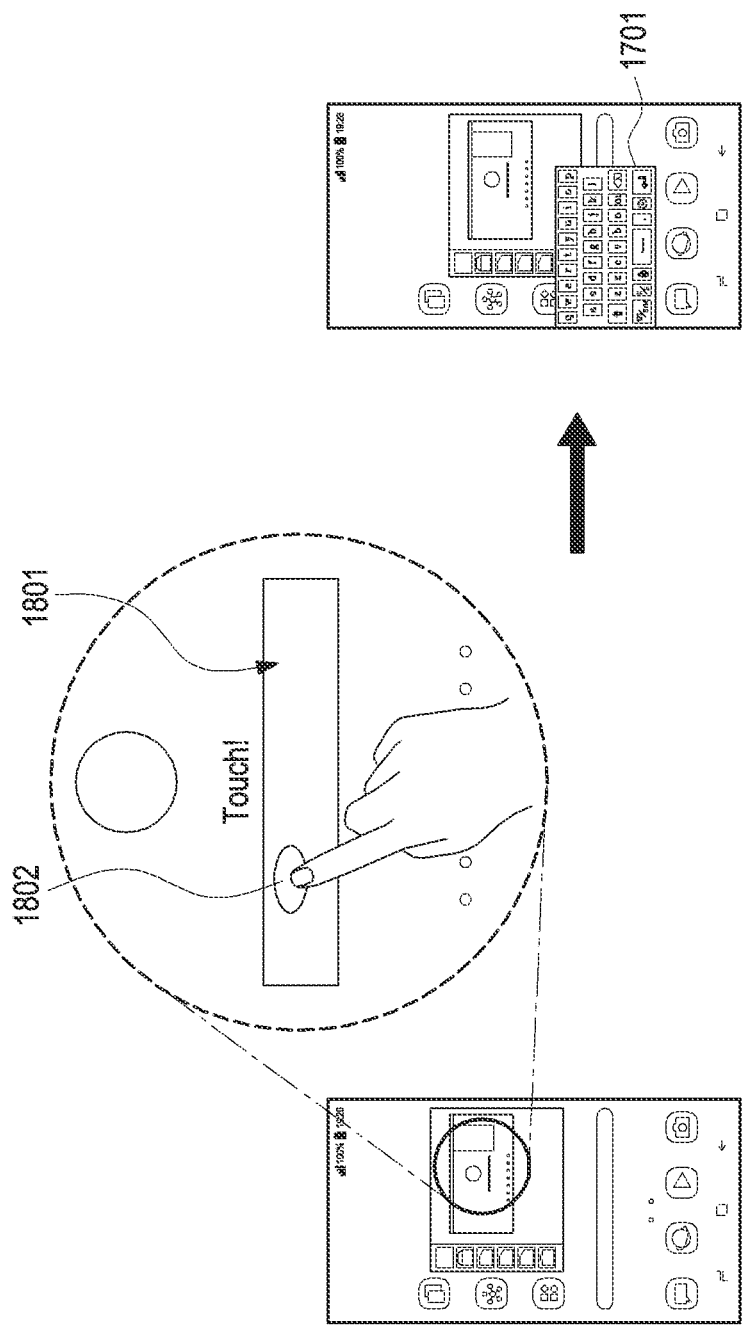
FIG. 18 is a view illustrating an example operation of an electronic device to execute an event identified in a first OS of the electronic device according to an embodiment of the disclosure.

FIG. 18 is a view illustrating an example operation of the electronic device 101 to execute an event identified on the first OS 220 of the electronic device 101 according to an embodiment of the disclosure.

Operation 1605 of the electronic device 101 is described below with reference to FIG. 18.

As at least part of operation 1605, the electronic device 101 may execute the third program 1701 corresponding to the received third data (e.g., data corresponding to a touch 1802 on the touch input box 1801) and control at least one hardware unit to process the executed third program 1701 (e.g., display the execution screen of the third program 1701 on the display of the electronic device 101).

As set forth above, the first OS may identify the data related to the second program 202 executed on the second OS 230 and execute an event defined in the first OS 220 based on the identified data related to the second program 202. Accordingly, the user of the electronic device 101 may receive a service related to the first OS 220 (e.g., executing an event defined in the first OS 220) while using the second program 202 executed on the second OS 230.

According to an embodiment, the electronic device 101 (e.g., at least one processor 120) may generate a user-defined event in response to failure to identify at least one event in operation 1606.

Operation 1606 of the electronic device 101 is described below with reference to FIG. 19.

Figure 19:
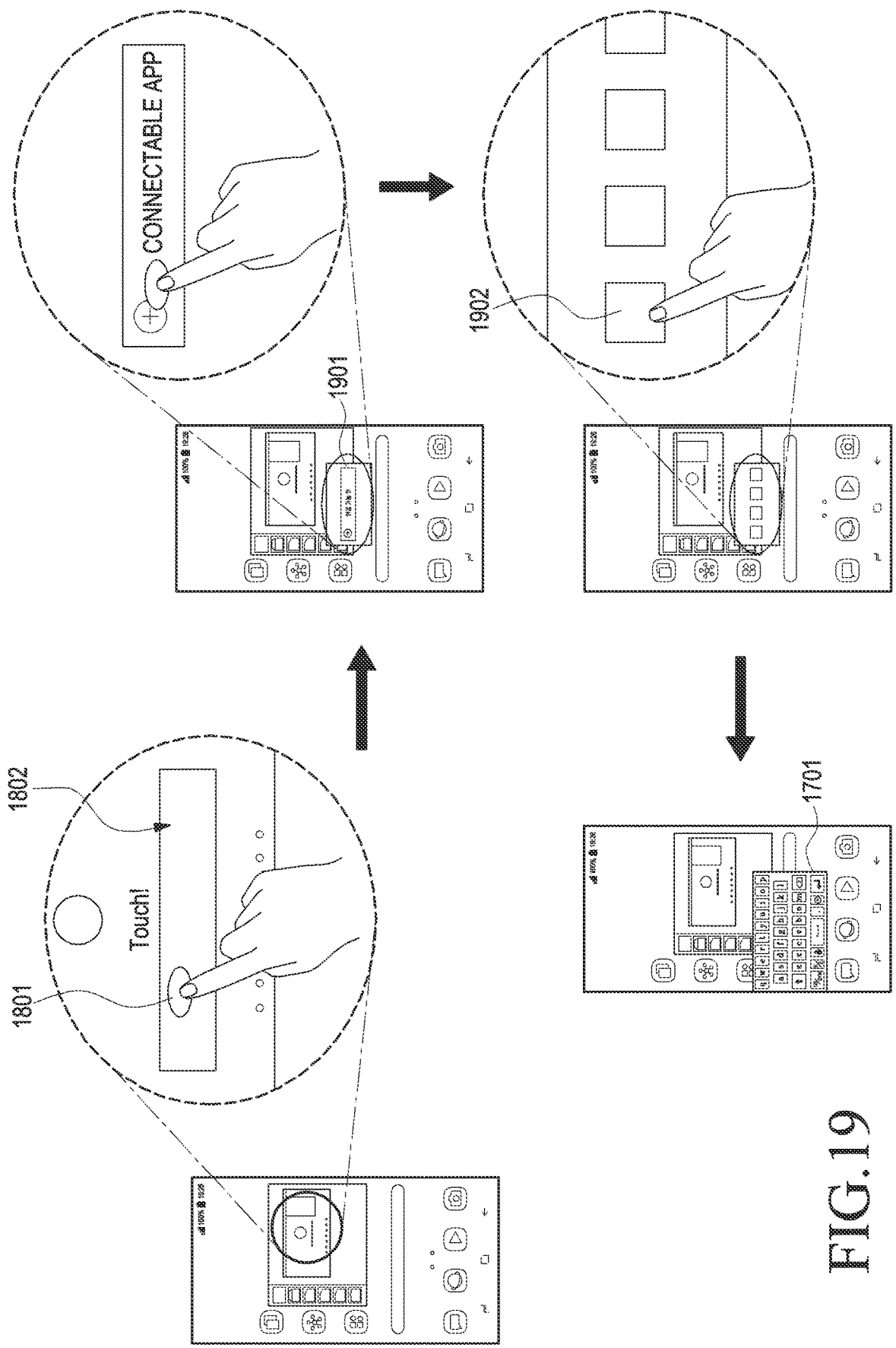
FIG. 19 is a view illustrating an example operation of generating a user-defined event of an electronic device according to an embodiment of the disclosure.

FIG. 19 is a view illustrating an example operation of generating a user-defined event of an electronic device 101 according to an embodiment of the disclosure.

Referring to FIG. 19, as at least part of operation 1606, the electronic device 101 (e.g., at least one processor 120) may display a user interface 1901 for generating a user-defined event in response to failure to identify at least one event. As an example, as shown in FIG. 18, the electronic device 101 may display a user interface for identifying a list of at least one application 1902 installed on the first OS 220 which may interwork with the obtained third data (e.g., data related to a touch 1802 on the text box 1801).

According to an embodiment, at least one application 1902 installed on the connectable first OS 220 may be determined depending on the user's preference. For example, the electronic device may identify the obtained third data and identify the user's use history for prior applications related to the identified third data. The electronic device 101 may identify that at least one application frequently executed is at least one application 1902 installed on the connectable first OS 220 based on the identified use history of prior applications.

According to an embodiment, the at least one application 1902 installed on the connectable first OS 220 may be identified by a deep learning algorithm or a machine learning algorithm. For example, the electronic device 101 may learn an execution pattern of a program executed by the user on the first OS 220 after obtaining designated data related to the second program 202 executed on the second OS 230 based on the deep learning algorithm or machine learning algorithm. The electronic device 101 may identify at least one application frequently executed by the user after obtaining the third data based on the learned execution pattern of the program executed by the user on the first OS 220. The electronic device 101 may identify that the at least one application identified is at least one application 1902 installed on the connectable first OS 220.

According to an embodiment, the electronic device 101 (e.g., at least one processor 120) may display at least one object related to each of at least one application 1902 in response to receiving a user input for invoking an application list on a user interface 1901 displayed as shown in FIG. 19 and receive a user input for selecting at least one from among at least one of the objects displayed.

According to an embodiment, in response to receiving a user input for selecting at least one from among at least one object displayed, the electronic device 101 (e.g., at least one processor 120) may identify that at least one corresponding application 1902 (e.g., a soft input panel (SIP) application) is an application (or third program 1701) regarding the third data. In other words, the electronic device 101 may generate a user-defined event in which at least one application (e.g., a SIP application) is automatically executed on the first OS 220 upon obtaining the third data.

According to an embodiment, when the user-defined event is generated, the electronic device 101 (e.g., at least one processor 120) may execute the third program 1701 corresponding to the user-defined event. Since execution of the third program 1701 may be performed as in operation 1605, no repeated description is presented in relation to execution of the third program 1701.

Without limited thereto, it is also possible to control at least one other hardware unit (e.g., a hardware resource such as a microphone or camera or an external electronic device, e.g., a keyboard, mouse, or printer, which may be used connected with the display) included in the electronic device in a similar manner to the embodiment of display related to execution of the third program.

Described below are various embodiments of methods of controlling the electronic device 101 to execute the first OS 220 and the second OS 230.

According to an embodiment, the electronic device 101 (e.g., at least one processor 120) may obtain data related to at least one program executed on the first OS 220 through at least one hardware unit related to at least one program executed on the first OS 220 and allow the obtained data related to the at least one program executed on the first OS 220 to be processed on the second OS 230.

Figure 21:
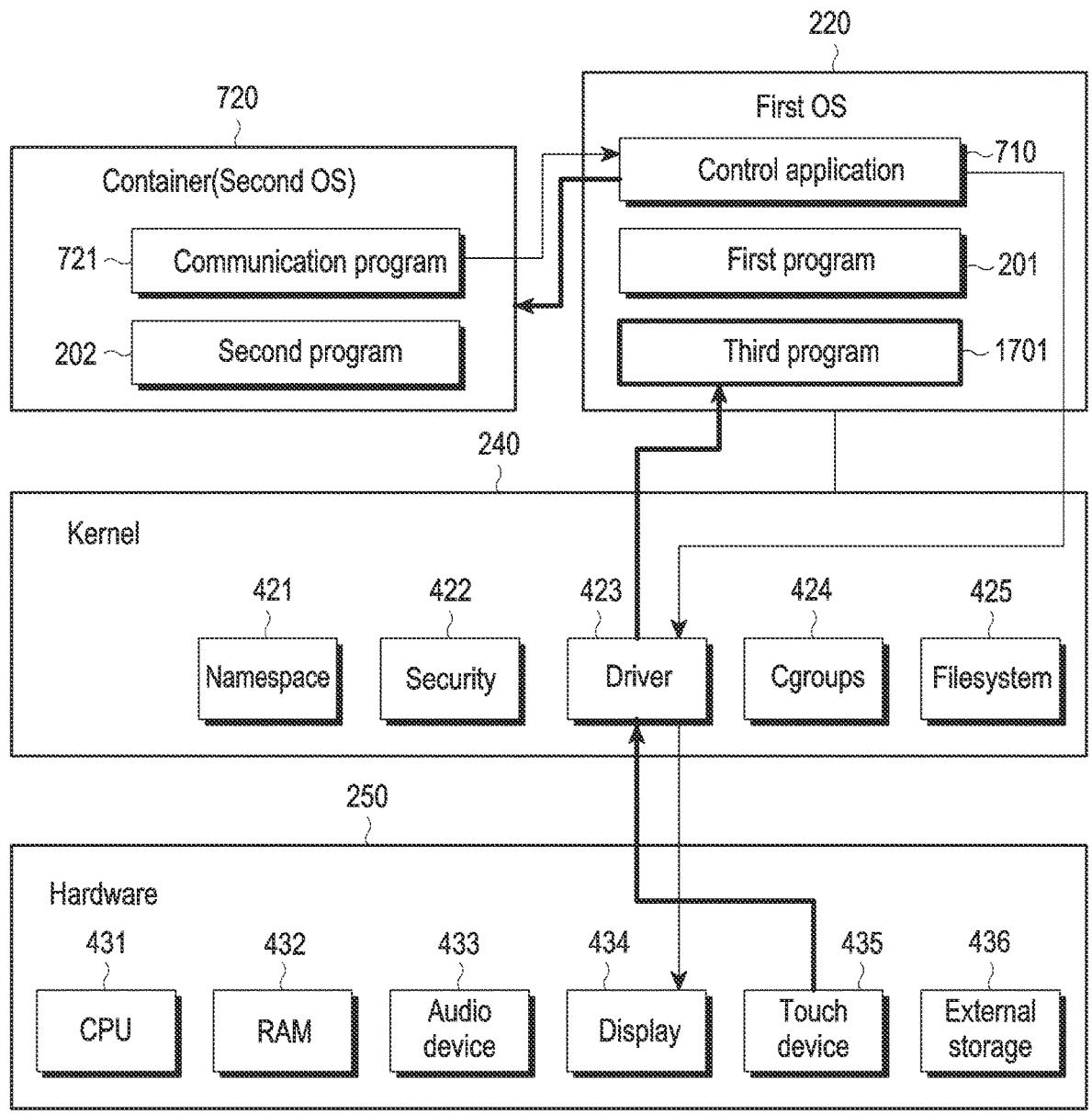
FIG. 21 is a view illustrating an example system structure of an electronic device according to an embodiment of the disclosure.

Now described with reference to FIG. 21 are a series of operations of the electronic device 101 to obtain data related to at least one program executed on the first OS 220 and allow the obtained data related to the at least one program executed on the first OS 220 to be processed on the second OS 230.

Figure 20:
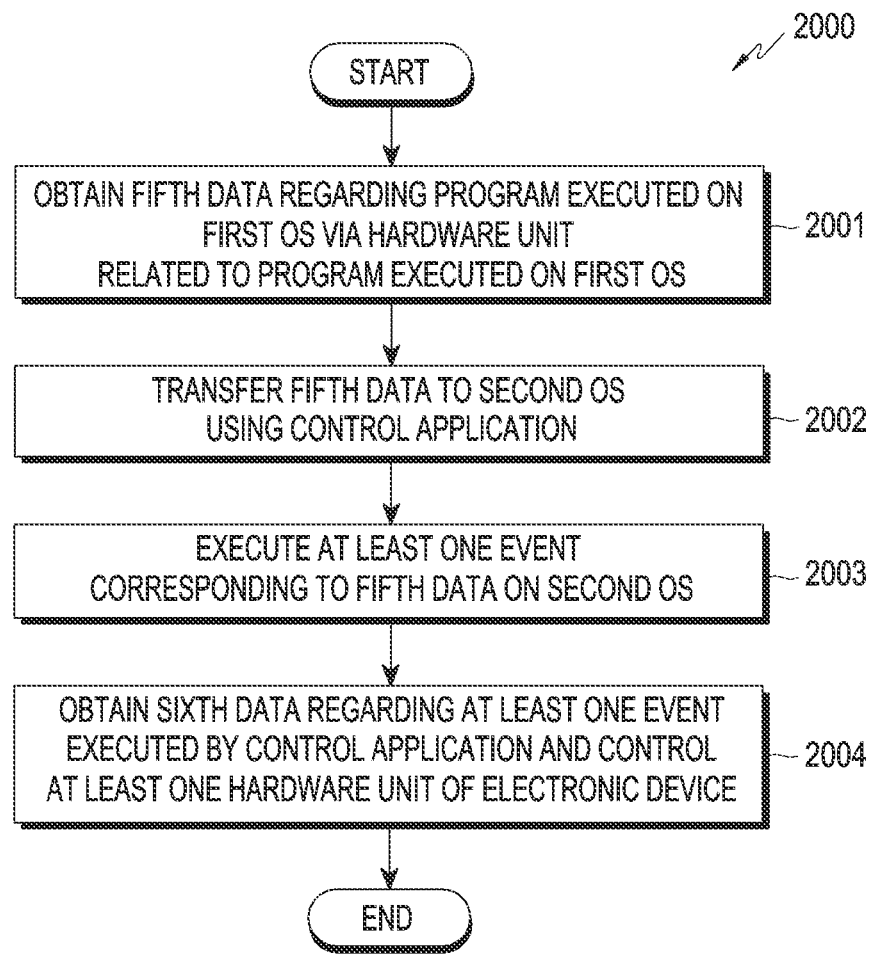
FIG. 20 is a flowchart illustrating an example operation of an electronic device to allow data related to at least one program executed on a first OS to be processed on a second OS according to an embodiment of the disclosure.

FIG. 20 is a flowchart 2000 illustrating an example operation of an electronic device 101 to allow data related to at least one program executed on a first OS 220 to be processed on a second OS 230 according to an embodiment of the disclosure.

Referring to FIG. 20, operations of the electronic device 101 are not limited to the operations of the electronic device 101 shown in FIG. 20 and may be performed in a different order than that shown or some operations may simultaneously be performed. According to an embodiment, other additional operations than the operations of the electronic device 101 shown in FIG. 20 may be performed or some of the operations of the electronic device 101 shown in FIG. 20 may be omitted.

FIG. 21 is a view illustrating an example system structure of an electronic device 101 according to an embodiment of the disclosure.

Referring to FIG. 21, in operation 2001, the electronic device 101 (e.g., at least one processor 120) may obtain fifth data regarding a program executed on the first OS 220 via a hardware unit related to a program executed on the first OS 220. For example, when at least one event (e.g., an event of copying an image included in a gallery program) executed on the first OS 220 occurs, the electronic device 101 may obtain the fifth data regarding at least one event regarding the first program 201. As another example, when at least one event (e.g., an event of receiving a user input for selecting a first character key of the SIP) regarding the third program 1701 executed on the first OS 220 occurs, the electronic device 101 may obtain the fifth data regarding at least one event regarding the third program 1701.

According to an embodiment, the electronic device 101 (e.g., at least one processor 120) may transfer the fifth data to the second OS 230 using the control application 710 in operation 2002.

According to an embodiment, the second OS 230 may execute at least one event regarding the fifth data in operation 2003.

According to an embodiment, in operation 2004, the electronic device 101 (e.g., at least one processor 120) may obtain sixth data regarding at least one event executed by the control application 710 and control at least one hardware unit of the electronic device 101.

Operations 2003 and 2004 of the electronic device 101 are described below in greater detail with reference to FIGS. 22 and 23.

Figure 22:
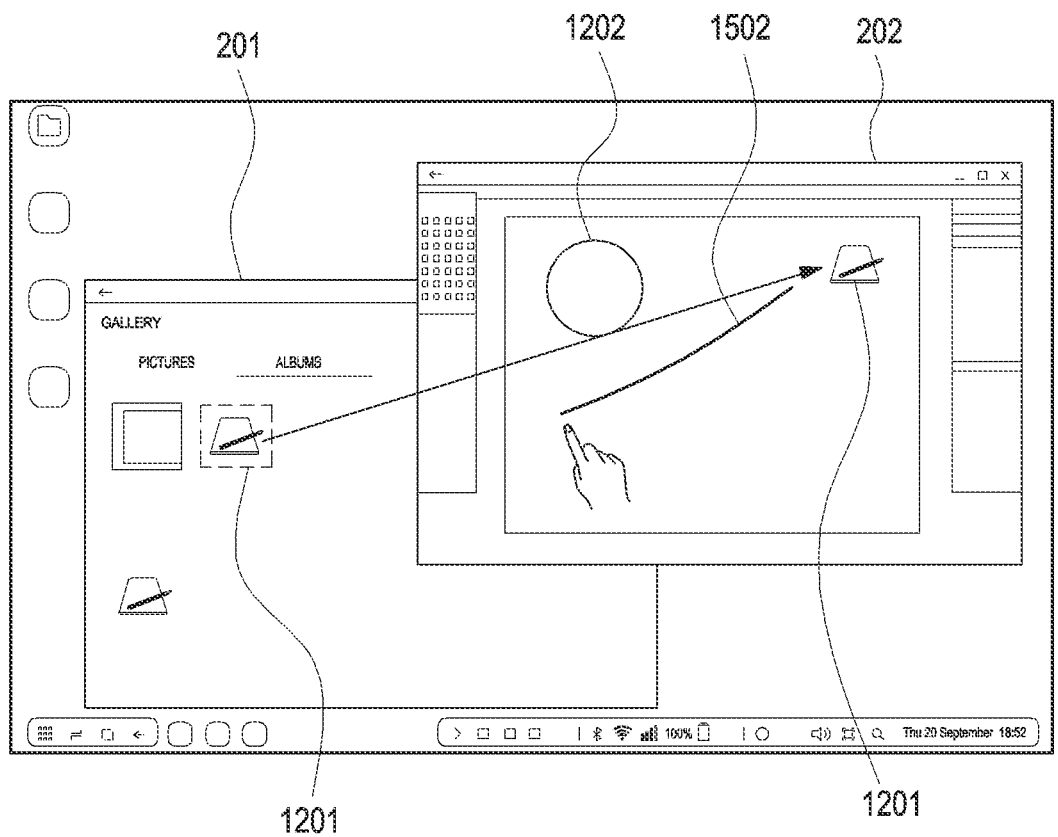
FIG. 22 is a view illustrating an example operation of an electronic device to allow data related to at least one program executed on a first OS to be processed on a second OS according to an embodiment of the disclosure.

FIG. 22 is a view illustrating an example operation of an electronic device 101 to allow data related to at least one program executed on a first OS 220 to be processed on a second OS 230 according to an embodiment of the disclosure.

Figure 23:
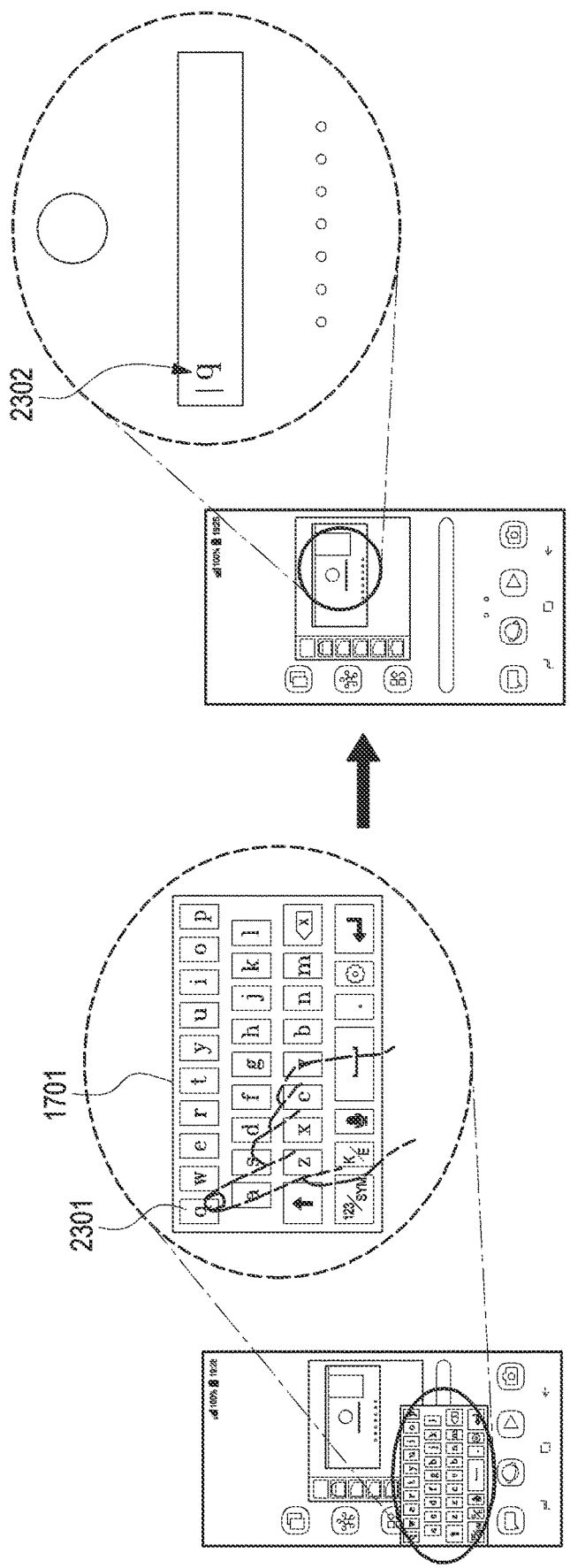
FIG. 23 is a view illustrating an example operation of an electronic device to allow data related to at least one program executed on a first OS to be processed on a second OS according to an embodiment of the disclosure.

FIG. 23 is a view illustrating an example operation of an electronic device 101 to allow data related to at least one program executed on a first OS 220 to be processed on a second OS 230 according to another embodiment of the disclosure.

Referring to FIG. 22, as at least part of operations 2003 and 2004, the second OS 230 may receive the fifth data regarding the event of copying an image 1201 included in the first program 201 (e.g., a gallery program). When detecting occurrence of an event associated with the fifth data (e.g., an event of pasting on the second program 202) after receiving the fifth data, the second OS 230 may paste the copied image 1201 included in the first program 201 onto the execution screen of the second program 202 based on the received fifth data. The control application 710 may receive sixth data regarding the image 1201 pasted to the second program 202 via at least some of the plurality of communication programs 721 of the second OS 230 and control at least a portion of the display of the electronic device 101 to display the image 1201 pasted onto the execution screen of the second program 202 using the kernel 240 of the first OS 220 based on the sixth data.

Referring to FIG. 23, the second OS 230 may receive fifth data regarding an event of receiving a user input for selecting a first character key 2301 of the third program 1701 (e.g., an SIP) as at least part of operations 2003 and 2004. The second OS 230 may allow a character 2302 corresponding to the fifth data to be entered to the text box 1801 of the second program 202 focused. The control application 710 may receive sixth data regarding the character entered to the text box 1801 via at least some of the plurality of communication programs 721 of the second OS 230 and control at least a portion of the display of the electronic device 101 to display the entered character 2302 on the text box 1801 of the execution screen of the second program 202 using the kernel 240 of the first OS 220 based on the sixth data.

Accordingly, the data (e.g., image data) related to the first program 201 executed on the first OS 220 of the electronic device 101 and the task performed in relation to the second program 202 executed on the second OS 230 (e.g., the second object drawn according to a user input on the second program 202) may be shared between the first program 201 executed on the first OS 220 and the second program 202 executed on the second OS 230. Thus, more convenience may be achieved in using the first OS 220 and the second OS 230 on the electronic device 101.

Without limited thereto, it is also possible to control at least one other hardware unit (e.g., a hardware resource such as a microphone or camera or an external electronic device, e.g., a keyboard, mouse, or printer, which may be used connected with the display) included in the electronic device in a similar manner to the embodiment of display related to control by the third program 1701.

According to an embodiment, an electronic device 101 may include at least one processor 120. The at least one processor 120 may be configured to control at least one first hardware unit included in the electronic device 101 to process first data from a first program 201 executed on the first OS 220, obtain a command for executing the second OS 230, generate a container 720 for executing the second OS 230 based on a kernel 240 of the first OS 220 in response to the command for executing the second OS 230, execute the second OS 230 on the generated container 720, execute a second program 202 on the second OS 230, obtain second data regarding the second program 202 from the second OS 230 via socket communication by a control application 710 installed on the first OS 220, and control at least one second hardware unit included in the electronic device 101 to process the second data regarding the second program based on the first OS 220 using the installed control application 710.

According to an embodiment, the at least one processor 120 may be configured to allocate the second OS 230 to a first namespace based on the kernel 240 of the first OS 220 and allocate at least some system resources of the electronic device 101 to process the second data regarding the second program using the installed control application. The second program 202 may be executed based on at least some of the system resources allocated to the second OS 230.

According to an embodiment, the at least one processor 120 may be configured to set an authority, on the electronic device 101, of the first namespace allocated to the second OS 230 using the installed control application 710.

According to an embodiment, the second OS 230 may include a plurality of communication programs 721. The at least one processor 120 may be configured to obtain the second data regarding the second program 202 from at least some of the plurality of communication programs 721 based on the socket communication by the installed control application 710 as at least part of obtaining the second data regarding the second program 202 from the second OS 230.

According to an embodiment, the at least one processor 120 may be configured to, as at least part of obtaining the second data regarding the second program 202 from the second OS 230, obtaining at least a part of the second data regarding the second program 202 related to audio information about the second program 202 from a first communication program among the plurality of communication programs 721 by the installed control application 710 and obtain at least another part of the second data regarding the second program 202 related to graphic information about the second program 202 from a second communication program among the plurality of communication programs 721.

According to an embodiment, the at least one processor 120 may be configured to, as at least part of controlling the at least one second hardware unit included in the electronic device 101 to process the second data regarding the second program 202, identify at least one driver of the kernel 240 of the first OS 220 corresponding to the obtained first data using the installed control application 710, identify the at least one second hardware unit included in the electronic device 101 based on the at least one driver, identified, of the kernel 240 of the first OS 220, and control the at least one second hardware unit based on the second data regarding the second program 202 using the installed control application 710.

According to an embodiment, the at least one processor 120 may be configured to, as at least part of controlling the at least one second hardware unit included in the electronic device 101 to process the second data regarding the second program 202, control the at least one second hardware unit while stopping at least some operations of the at least one first hardware unit.

According to an embodiment, the at least one processor 120 may be configured to, as at least part of controlling the at least one second hardware unit included in the electronic device 101 to process the second data regarding the second program 202, when at least part of an execution screen of the first program 201 is displayed on at least part of a first area of a display, stop the at least part of the execution screen of the first program 201 from being displayed on the at least part of the first area of the display using the installed control application 710 and perform control to allow at least part of an execution screen of the second program 202 to be displayed on the at least part of the first area of the display and at least another part of the execution screen of the second program 202 to be displayed on a second area.

According to an embodiment, the at least one processor 120 may be configured to obtain third data regarding the second program 202 executed on the second OS 230 using at least part of hardware included in the electronic device 101, obtain the third data by the installed control application 710, transfer the obtained third data to the second OS 230 using the installed control application 710, and execute at least one event regarding the third data by the second program 202.

According to an embodiment, the at least one processor 120 may be configured to obtain fourth data for invoking a touchpad provided from the first OS 220 using at least part of hardware included in the electronic device 101, obtain the fourth data by the installed control application 710, and display the touchpad corresponding to the fourth data on at least another part of the display 160 using the installed control application 710.

According to an embodiment, the at least one processor 120 may be configured to transfer information entered using the touchpad to the second program 202 using the installed control application 710 and display a result of processing the information entered using the touchpad of the second program 202 on the at least part of the display 160.

According to an embodiment, the at least one processor 120 may be configured to, as at least part of controlling at least one second hardware unit included in the electronic device 101 to process the second data regarding the second program 202 based on the first OS 220 using the installed control application 710, when the electronic device 101 is connected with an external electronic device 201, transmit a result of processing the second data regarding the second program 202 to the external electronic device 201.

According to an embodiment, a method of controlling an electronic device 101 may include controlling at least one first hardware unit included in the electronic device 101 to process first data from a first program 201 executed on the first OS 220, obtaining a command for executing the second OS 230, generating a container 720 for executing the second OS 230 based on a kernel 240 of the first OS 220 in response to the command for executing the second OS 230, executing the second OS 230 on the generated container 720, executing a second program 202 on the second OS 230, obtaining second data regarding the second program 202 from the second OS 230 via socket communication by a control application 710 installed on the first OS 220, and controlling at least one second hardware unit included in the electronic device 101 to process the second data regarding the second program based on the first OS 220 using the installed control application 710.

According to an embodiment, the control method may further include allocating the second OS 230 to a first namespace based on the kernel 240 of the first OS 220 and allocate at least some of system resources of the electronic device 101 to process the second data regarding the second program using the installed control application. The second program 202 may be executed based on at least some of the system resources allocated to the second OS 230.

According to an embodiment, the control method may further include setting an authority, on the electronic device 101, of the first namespace allocated to the second OS 230 using the installed control application 710.

According to an embodiment, the second OS 230 may include a plurality of communication programs 721. Obtaining the second data regarding the second program 202 from the second OS 230 may include obtaining the second data regarding the second program 202 from at least some of the plurality of communication programs 721 based on the socket communication by the installed control application 710.

According to an embodiment, obtaining the second data regarding the second program 202 from the second OS 230 may include obtaining at least a part of the second data regarding the second program 202 related to audio information about the second program 202 from a first communication program among the plurality of communication programs 721 by the installed control application 710 and obtaining at least another part of the second data regarding the second program 202 related to graphic information about the second program 202 from a second communication program among the plurality of communication programs 721.

According to an embodiment, controlling the at least one second hardware unit included in the electronic device 101 to process the second data regarding the second program 202 may include identifying at least one driver of the kernel 240 of the first OS 220 corresponding to the obtained first data using the installed control application 710, identifying the at least one second hardware unit included in the electronic device 101 based on the at least one driver, identified, of the kernel 240 of the first OS 220, and controlling the at least one second hardware unit based on the second data regarding the second program 202 using the installed control application 710.

According to an embodiment, controlling the at least one second hardware unit included in the electronic device 101 to process the second data regarding the second program 202 may control the at least one second hardware unit while stopping at least some operations of the at least one first hardware unit.

According to an embodiment, an electronic device 101 comprises a display 160, at least one processor 120 operatively connected with the display 160, and a memory 130 operatively connected to the processor 120, wherein the memory 130 may store instructions executed to enable the at least one processor 120 to display at least one first icon for executing each of at least one first application associated with a first OS 220 and a second icon for executing a second OS 230 different from the first OS 220 on the display 160, receive a first input for the second icon, display at least one third icon for executing each of at least one second application associated with the second OS 230 on at least part of the display 160 based on the first input, receive a second input for one of the at least one third icon, and display an execution screen of an application corresponding to an icon designated by the second input on the at least part of the display 160 based on the second input.

In the above-described embodiments related to touch input by the user, the touch input may be replaced with a click input using a point on the user's display (e.g., point control using, e.g., a mouse connected to the electronic device 101).

As is apparent from the foregoing description, according to various embodiments of the disclosure, there may be provided an electronic device and method of operating the same, which may form an environment (e.g., generate a container or allocate a namespace) in which a plurality of OSs are executable so that the plurality of OSs may be executed on the electronic device and may distribute the hardware resources of the electronic device to prevent programs running on the plurality of OSs from conflicting with each other. According to various embodiments of the disclosure, it is possible to prevent conflicts among a plurality of OSs running on an electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a memory stores executable instructions;
a plurality of hardware devices; and when the instructions execute causing at least one processor configured to:
operate a first operating system (OS),
operate a second OS while the first OS is operated, the second OS including a plurality of programs,
control a first part of the plurality of hardware devices to process first data from a first application executed based on the first OS, execute a second application based on the second OS,
obtain by a control application executed based on the first OS, at least part of second data regarding the second application from a first program corresponding to a first type of the at least part of the second data among the plurality of programs of the second OS, and at least another part of the second data from a second program corresponding to a second type of the at least another part of the second data among the plurality of programs of the second OS, and
control a second part of the plurality of hardware devices to process the second data regarding the second application, using the control application.

2. The electronic device of claim 1,
wherein the at least one processor is further configured to:
obtain a command for executing the second OS while the first OS is executed,
based on the command for executing the second OS, generate a container for executing the second OS based on a kernel of the first OS,
execute the second OS based on the generated container,
allocate the second OS to a first namespace based on the kernel of the first OS, and
allocate at least some of system resources of the electronic device to process the second data regarding the second application using the control application, and
wherein the second application is executed based on at least some of the system resources allocated to the second OS.

3. The electronic device of claim 2, wherein the at least one processor is further configured to set an authority, on the electronic device, of the first namespace allocated to the second OS using the control application.

4. The electronic device of claim 1, wherein the at least one processor is further configured to obtain the second data regarding the second application from at least some of the plurality of programs based on a socket communication by the control application.

5. The electronic device of claim 1, wherein the at least one processor is further configured to:
identify at least one driver of a kernel of the first OS corresponding to the first data using the control application;
identify the second part of the plurality of hardware devices included in the electronic device based on the at least one driver, identified, of the kernel of the first OS; and control the second part of the plurality of hardware devices based on the second data regarding the second application using the control application.

6. The electronic device of claim 1,
wherein the second part of the plurality of hardware devices corresponds to at least part of the first part of the plurality of hardware devices, and
wherein the at least one processor is further configured to control the second part of the plurality of hardware devices while stopping the controlling of the at least part of the first part of the plurality of hardware devices.

7. The electronic device of claim 6, wherein the at least one processor is further configured to:
in case at least part of an execution screen of the first application is displayed on at least part of a first area of a display, stop the at least part of the execution screen of the first application from being displayed on the at least part of the first area of the display using the control application; and
perform control at least part of an execution screen of the second application to be displayed on the at least part of the first area of the display and at least another part of the execution screen of the second application to be displayed on a second area.

8. The electronic device of claim 1, wherein the at least one processor is further configured to:
obtain third data regarding the second application executed on the second OS using at least part of hardware included in the electronic device;
obtain the third data by the control application, transfer the obtained third data to the second OS using the control application; and
execute at least one event regarding the third data by the second application.

9. The electronic device of claim 1, wherein the at least one processor is further configured to:
obtain fourth data for invoking a touchpad provided from the first OS using at least part of hardware included in the electronic device;
obtain the fourth data by the control application; and
display the touchpad corresponding to the fourth data on at least another part of the display using the control application.

10. The electronic device of claim 9, wherein the at least one processor is further configured to:
transfer information entered using the touchpad to the second application using the control application; and
display a result of processing the information entered using the touchpad of the second application on the at least part of the display.

11. The electronic device of claim 1, wherein the at least one processor is further configured to, based on the electronic device being connected with an external electronic device, transmit a result of processing the second data regarding the second application to the external electronic device.

12. A method for controlling an electronic device, the method comprising:
operating a first operating system (OS),
operating a second OS while the first OS is operated, including a plurality of programs,
controlling a first part of a plurality of hardware devices included in the electronic device to process first data from a first application executed based on the first OS;
executing a second application based on the second OS;
obtaining by a control application executed based on the first OS, at least part of second data regarding the second application from a first program corresponding to a first type of the at least part of the second data among the plurality of programs of the second OS, and at least another part of the second data from a second program corresponding to a second type of the at least another part of the second data among the plurality of programs of the second OS; and controlling a second part of the plurality of hardware devices included in the electronic device to process the second data regarding the second application using the control application.

13. The method of claim 12, further comprising:
obtaining a command for executing the second OS while the first OS is executed;
based on the command for executing the second OS, generating a container for executing the second OS based on a kernel of the first OS;
executing the second OS based on the generated container;
allocating the second OS to a first namespace based on the kernel of the first OS and allocate at least some of system resources of the electronic device to process the second data regarding the second application using the control application,
wherein the second application is executed based on at least some of the system resources allocated to the second OS.

14. The method of claim 13, further comprising:
setting an authority, on the electronic device, of the first namespace allocated to the second OS using the control application.

15. The method of claim 12, wherein obtaining the second data regarding the second application from the second OS includes obtaining the second data regarding the second application from at least some of the plurality of programs based on a socket communication by the control application.

16. The method of claim 12, wherein the controlling of the second part of the plurality of hardware devices included in the electronic device to process the second data regarding the second application includes:
identifying at least one driver of a kernel of the first OS corresponding to the first data using the control application;
identifying the second part of the plurality of hardware devices included in the electronic device based on the at least one driver, identified, of the kernel of the first OS; and
controlling the second part of the plurality of hardware devices based on the second data regarding the second application using the control application.

17. The method of claim 12,
wherein the second part of the plurality of hardware devices corresponds to at least part of the first part of the plurality of hardware devices, and
wherein the controlling of the second part of the plurality of hardware devices included in the electronic device to process the second data regarding the second application includes controlling the second part of the plurality of hardware devices while stopping at least some operations the at least part of the first part of plurality of hardware devices.

* * * * *